United States Patent
Matsunaga et al.

(10) Patent No.: US 9,664,523 B2
(45) Date of Patent: May 30, 2017

(54) MAP DISPLAY SYSTEM

(71) Applicant: DENSO CORPORATION, Kariya, Aichi-pref. (JP)

(72) Inventors: Takayuki Matsunaga, Hachioji (JP); Nobuhiro Mizuno, Ichihara (JP)

(73) Assignee: DENSO CORPORATION, Kariya (JP)

( * ) Notice: Subject to any disclaimer, the term of this patent is extended or adjusted under 35 U.S.C. 154(b) by 14 days.

(21) Appl. No.: 14/651,830

(22) PCT Filed: Nov. 18, 2013

(86) PCT No.: PCT/JP2013/006745
§ 371 (c)(1),
(2) Date: Jun. 12, 2015

(87) PCT Pub. No.: WO2014/103142
PCT Pub. Date: Jul. 3, 2014

(65) Prior Publication Data
US 2015/0308841 A1   Oct. 29, 2015

(30) Foreign Application Priority Data
Dec. 25, 2012 (JP) ................. 2012-280982

(51) Int. Cl.
*G01C 21/32* (2006.01)
*G09B 29/00* (2006.01)
(Continued)

(52) U.S. Cl.
CPC ............. *G01C 21/32* (2013.01); *G01C 21/30* (2013.01); *G01C 21/367* (2013.01); *G06T 17/05* (2013.01);
(Continued)

(58) Field of Classification Search
CPC .... G01C 21/32; G01C 21/34; G01C 21/3415; G01C 21/3492
(Continued)

(56) References Cited

U.S. PATENT DOCUMENTS 6,970,783 B2 * 11/2005 Knockeart ......... G01C 21/3415
342/357.31
2002/0060642 A1 * 5/2002 Togasaka ............... A63B 71/06
342/357.25
(Continued)

FOREIGN PATENT DOCUMENTS

JP       H09-311623 A      12/1997
JP       2002-310690 A     10/2002
(Continued)

OTHER PUBLICATIONS

International Search Report and Written Opinion of the International Searching Authority dated Feb. 18, 2014 issued in the corresponding International application No. PCT/JP2013/006745 (and English translation).

*Primary Examiner* — Redhwan k Mawari
(74) *Attorney, Agent, or Firm* — Posz Law Group, PLC

(57) ABSTRACT

A navigation apparatus transmits current position information to a server. The server transmits course data to the navigation apparatus; the course data indicates a course that is predicted based on the current position information. The navigation apparatus corrects a subsequently measured current position on the course specified by the course data. The navigation apparatus transmits corrected position information indicating the corrected position to the server. The server distributes map data to the navigation apparatus; the map data corresponds to a specified area containing the corrected position specified by the corrected position information. Based on the received map data, the navigation (Continued)

apparatus displays a map near the corrected position on a screen of a display portion.

14 Claims, 19 Drawing Sheets

(51) Int. Cl.
  *G09B 29/10* (2006.01)
  *G01C 21/30* (2006.01)
  *G01C 21/36* (2006.01)
  *G06T 17/05* (2011.01)
  *G08G 1/0968* (2006.01)

(52) U.S. Cl.
  CPC ........... *G09B 29/00* (2013.01); *G09B 29/005* (2013.01); *G09B 29/10* (2013.01); *G09B 29/106* (2013.01); *G08G 1/096822* (2013.01); *G08G 1/096844* (2013.01)

(58) Field of Classification Search
  USPC .......................................................... 701/533
  See application file for complete search history.

(56) References Cited

U.S. PATENT DOCUMENTS

| | | | |
|---|---|---|---|
| 2002/0128768 A1 | 9/2002 | Nakano et al. | |
| 2010/0121564 A1* | 5/2010 | Kobayashi | G01C 21/34 701/533 |
| 2011/0202271 A1* | 8/2011 | Kruithof | G01C 21/32 701/533 |
| 2011/0224898 A1* | 9/2011 | Scofield | G01C 21/3492 701/532 |
| 2011/0282579 A1* | 11/2011 | Uyama | G01C 21/32 701/532 |
| 2012/0130638 A1* | 5/2012 | Uyama | G01C 21/34 701/533 |
| 2015/0308841 A1* | 10/2015 | Matsunaga | G01C 21/30 701/428 |

FOREIGN PATENT DOCUMENTS

| | | |
|---|---|---|
| JP | 2002-310691 A | 10/2002 |
| JP | 2009-058250 A | 3/2009 |
| JP | 2010-038890 A | 2/2010 |
| JP | 2010-197406 A | 9/2010 |
| JP | 2012-108084 A | 6/2012 |
| JP | 2012-137423 A | 7/2012 |

* cited by examiner

MAP DISPLAY SYSTEM

CROSS REFERENCE TO RELATED APPLICATION

This present disclosure is a U.S. national stage of International Application No. PCT/JP2013/006745 filed on Nov. 18, 2013 and is based on Japanese Patent Application No. 2012-280982 filed on Dec. 25, 2012, the disclosures of which are incorporated herein by reference.

TECHNICAL FIELD

The present disclosure relates to a map display system.

BACKGROUND ART

For example, a vehicle is mounted with a navigation apparatus as a map display apparatus to display a map based on map data. The navigation apparatus uses the map matching technique that matches the current position with a road to correct an error in the current position. Recently, for example, the navigation apparatus in patent literature 1 uses raster map data as map data distributed from a server.

PRIOR ART LITERATURES

Patent Literature

Patent Literature 1: JP 2002-310691 A

SUMMARY OF INVENTION

The navigation apparatus uses map data that may include vector-form map data (hereinafter referred to as vector map data) and raster-form map data (hereinafter referred to as raster map data). The vector map data used as map data includes road data such as node information indicating a node included in the road and link information indicating a link that connects nodes to each other. The navigation apparatus can specify a position or a shape of the road in the map based on the road data. Therefore, the navigation apparatus can provide the map matching by correcting the current position so as to be consistent with the road.

However, the raster map data used as map data does not contain road data. The navigation apparatus cannot specify a road position or shape on the map based on the road data. Consequently, the navigation apparatus cannot match the current position to the road and cannot perform the map matching. To solve this issue, there is proposed a technology that attaches road data to the raster map data to enable the map matching. However, attaching road data to the raster map data increases the total amount of map data.

It is an object of the present disclosure to provide a map display system capable of performing map matching regardless of types of map data.

According to an example of the present disclosure, a map display system is provided as follows. A map display apparatus transmits current position information indicating a current position of either the map display apparatus or a vehicle mounted with the map display apparatus, to a server. The server predicts a course of either the map display apparatus or the vehicle based on the received current position information and transmits course data indicating the predicted course to the map display apparatus. It is noted that the map display apparatus transmits the current position information to the server constantly (each time the current position information changes, or regardless of whether or not the current position information changes). That is, the map display apparatus transmits equal to or greater than one current position information. The server predicts the course based on the received current position information constantly (when the received current position information changes, or regardless of whether or not the received current position information changes). The server transmits the course indicating a new course when the predicted course changes. The map display apparatus corrects a current position of either the map display apparatus or vehicle subsequently measured on the course specified by the received course data, and transmits corrected position information indicating a position on the course corrected (corrected position) to the server. The server specifies the corrected position based on the received corrected position information, and distributes the map data corresponding to a specified area containing the corrected position to the map display apparatus. The map display apparatus displays a map surrounding the corrected position on a screen of a display portion, based on the received map data.

In the map display system according to this example, the map display apparatus matches the current position with a course predicted by the server. The server supplies the map display apparatus with map data near the position matched with the course. This enables to display the map so as to match the current position of the map display apparatus or the vehicle with the predicted course even if the map data contains no road data. The map matching can be performed regardless of map data types.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
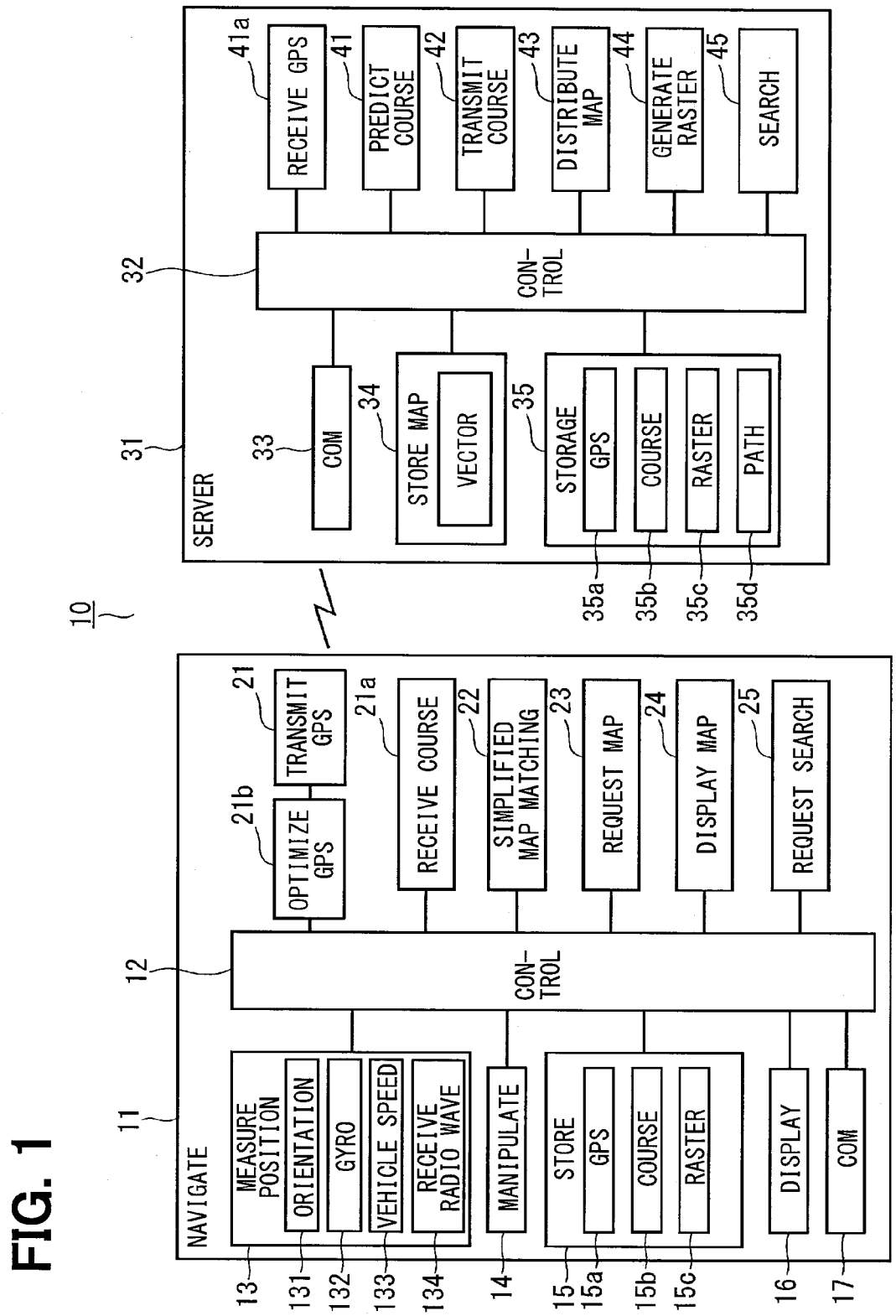
FIG. 1 is a functional block diagram schematically illustrating a configuration of a map display system according to an embodiment.

The following describes an embodiment of the present disclosure with reference to the accompanying drawings. As in FIG. 1, a map display system 10 includes a navigation apparatus 11 and a server 31. The navigation apparatus 11 is mounted on a vehicle such as a car. The server 31 is capable of communication with the navigation apparatus 11. A vehicle mounted with the navigation apparatus 11 is also referred to as a host vehicle or a subject vehicle.

The navigation apparatus 11 corresponds to a map display apparatus that displays a map based on map data. The navigation apparatus 11 includes a control circuit 12, a position measuring portion 13, a manipulation portion 14, a storage unit 15, a display portion 16, and a communication portion 17. The control circuit 12 mainly includes a microcomputer including a CPU, ROM, and RAM (unshown). The control circuit 12 controls entire operation of the navigation apparatus 11. The control circuit 12 performs a control program in the CPU to virtually implement a GPS information transmission processor 21, a course data reception processor 21a, a GPS information optimization processor 21b, a simplified map matching processor 22, a map request processor 23, a map display processor 24, and a route search request processor 25 based on the software. The GPS information transmission processor 21, the course data reception processor 21a, the GPS information optimization processor 21b, the simplified map matching processor 22, the map request processor 23, the map display processor 24, and the route search request processor 25 may be implemented as hardware such as an integrated circuit integrated with the control circuit 12.

The position measuring portion 13 corresponds to a current position measuring processor, device, or means. The position measuring portion 13 measures a current position of the navigation apparatus 11, namely, a current position (a host vehicle position or simply a vehicle position) of a vehicle (a host vehicle) mounted with the navigation apparatus 11. The position measuring portion 13 outputs GPS information to the control circuit 12. The GPS information contains current position information indicating the measured current position.

The present application uses "information" as a countable noun as well as an uncountable noun; namely, informations are understood as several pieces of information or several information items.

The position measuring portion 13 includes various detection instruments such as an orientation sensor 131, a gyro sensor 132, a vehicle speed pulse sensor 133, and a satellite radio wave receiver 134. The orientation sensor 131 detects the vehicle's orientation. The gyro sensor 132 detects the vehicle's rotation angle. The vehicle speed pulse sensor 133 detects a vehicle speed pulse outputted from a vehicle speed pulse generator (unshown) according to a vehicle speed. The satellite radio wave receiver 134 receives a radio wave transmitted from a positioning satellite (unshown) so that the positioning system measures the vehicle's current position. The position measuring portion 13 measures the current position of the navigation apparatus 11 or the vehicle based on detection values from the orientation sensor 131, the gyro sensor 132, the vehicle speed pulse sensor 133, and the satellite radio wave receiver 134. The GPS information outputted from the position measuring portion 13 contains not only the current position information, but also orientation data detected by the orientation sensor 131, angle data detected by the gyro sensor 132, vehicle speed pulse data outputted from the vehicle speed pulse sensor 133, and position data and angle data outputted from the satellite radio wave receiver 134.

The manipulation portion 14 includes a mechanical switch and a touch panel switch. The mechanical switch is provided near the screen of the display portion 16. The touch panel switch is provided on the screen of the display portion 16. Using the switches on the manipulation portion 14, a user can enter various commands to specify a destination for the route guidance, change a display screen configuration or a display mode (such as changing the scale of a map to be displayed, selecting a menu screen, searching for a route, starting the route guidance, correcting the current position, and adjusting the sound volume), and request the server 31 to search for a route. This enables the navigation apparatus 11 to operate according to the user's instruction.

The storage unit 15 includes a storage medium such as a removable flash memory card or a hard disk drive. As will be described in detail later, the storage unit 15 stores vector map data and other various data such as raster map data and course data distributed from the server 31. The storage unit 15 includes storage portions (storage areas) corresponding to various data such as a GPS information storage portion 15a, a course data storage portion 15b, and a raster map data storage portion 15c. The GPS information storage portion 15a stores GPS information outputted from the position measuring portion 13. As will be described in detail later, the course data storage portion 15b stores course data transmitted from the server 31. As will be described in detail later, the raster map data storage portion 15c stores raster map data distributed from the server 31. The storage unit 15 may be also used as RAM or EEPROM provided for the control circuit 12 of the navigation apparatus 11.

The display portion 16 includes a liquid crystal or organic EL color display. The screen of the display portion 16 can display a map near the vehicle's current position in various scales based on vector map data or raster map data. The screen of the display portion 16 displays current position mark M overlapping with the displayed map. Current position mark M indicates the vehicle's current position and travel direction. The display portion 16 displays a route guidance screen to perform the route guidance to a destination. The communication portion 17 includes a wireless communication module, for example. The communication portion 17 establishes a wireless communication line with the server 31 and performs various communications with the server 31 using the communication line.

The GPS information transmission processor 21 corresponds to a current position information transmission processor, device, or means. The GPS information transmission processor 21 transmits information indicating the current position measured by the position measuring portion 13, i.e., the GPS information outputted from the position measuring portion 13, to the server 31 via the communication portion 17. In this case, the GPS information transmission processor 21 always transmits the GPS information to the server 31 (regardless of whether or not the content of the GPS information is changed, or, each time the content of the GPS information is changed). The GPS information transmission processor 21 does not transmit the GPS information as is outputted from the position measuring portion 13. The GPS information optimization processor 21b corrects the GPS information to optimal position information. The GPS information transmission processor 21 transmits the corrected information to the server 31. To optimize the GPS information to be transmitted to the server 31, the GPS information optimization processor 21b removes information affected by the multipath phenomenon from the GPS information outputted from the position measuring portion 13, for example. The multipath phenomenon signifies that a radio wave from the positioning satellite reflects off a building, for example, and is received via several routes.

As will be described in detail later, the course data reception processor 21a receives course data from the server 31 via the communication portion 17. The course data storage portion 15b stores the received course data.

The simplified map matching processor 22 corresponds to a position correction processor, device, or means. As will be described in detail later, the simplified map matching processor 22 corrects a current position measured by the position measuring portion 13 to a position on a route (hereinafter referred to as a "predicted course") specified by the course data received from the server 31. The simplified map matching processor 22 performs simplified map matching that simply matches the current position to the predicted course independently of the map. In this case, the simplified map matching processor 22 moves the current position to a position that is included in the predicted course and is nearest to the current position before the correction. The simplified map matching processor 22 may correct the current position by referencing the vehicle's angle data detected by the gyro sensor 132 or angle data detected by the satellite radio wave receiver 134. This enables to more accurately correct the current position. The simplified map matching processor 22 may not perform the simplified map matching process if the current position before the correction is distanced from the predicted course at a specified distance or longer or if the vehicle's traveling direction (angle) before the correction deviates from a direction along the predicted course at a specified angle or more.

The map request processor 23 corresponds to a corrected position information transmission processor, device, or means. The map request processor 23 specifies a corrected position corresponding to the position corrected by the simplified map matching processor 22 on the predicted course. The map request processor 23 transmits corrected position information indicating the corrected position to the server 31 via the communication portion 17. In this case, the map request processor 23 also transmits information (hereinafter referred to as "screen size specification information") specifying the screen size of the display portion 16 to the server 31 via the communication portion 17. When a map displayed on the display portion 16 is scrolled, the map request processor 23 can transmit the position information after scrolling (scrolled position information) to the server 31 via the communication portion 17. The navigation apparatus 11 may display a host vehicle position on the display portion 16 with reference to the corrected position or the scrolled position as the center.

The map request processor 23 can transmit various informations needed to display a map to the server 31 via the communication portion 17. For example, the information to be transmitted includes general information needed to display a map such as latitude and longitude information indicating the center position of the displayed map, rotation angle information indicating a rotation angle of a displayed screen, scale information indicating a map scale (scale ratio) of the map, and size information indicating the displayed screen.

The latitude and longitude information about the display center need not be the center of the display screen. The display portion 16 may use a heading-up orientation, namely, the display technique that rotates the map corresponding to the traveling direction. In such a case, the display center is settled below the screen center. This display technique can widen a forward view along the traveling direction in the display screen of the display portion 16. The map request processor 23 may transmit latitude and longitude information about four corners of the display screen instead of the latitude and longitude information about the display center. The map request processor 23 may transmit elevation angle information indicating an elevation angle when a map is displayed in three dimensions. The map request processor 23 may transmit these informations at the same time or separately at different timings. The map request processor 23 may transmit only modified information, namely, only differential information. For example, the map request processor 23 may transmit only the position information when the position information is modified. The map request processor 23 may transmit only the scale information when the map scale is changed.

The map display processor 24 corresponds to a map display device or means. The map display processor 24 displays a map on the screen of the display portion 16 based on raster map data previously stored in the raster map data storage portion 15c or raster map data that is newly distributed from the server 31 and is stored in the raster map data storage portion 15c, as will be described in detail later. The map display processor 24 performs a map display process based on the raster map data that is stored in the raster map data storage portion 15c at the time of displaying the map. In this case, the map display processor 24 is set to display a map in the raster form. The navigation apparatus 11 can also display a map on the screen of the display portion 16 based on vector map data.

A position along the predicted course may be corrected by the simplified map matching processor 22 and may be defined as a corrected position. Alternatively, a user manipulation may change the display content (position or scale) of a map. In such a case, the map display processor 24 determines whether or not the raster map data storage portion 15c includes raster map data corresponding to a map near the corrected position or a map reflecting the changed display content. The map display processor 24 transmits a raster map request signal to the server 31 via the communication portion 17 if the raster map data storage portion 15c does not include the corresponding raster map data. A map request is not always performed (each time a map is displayed) but when the map display processor 24 transmits the raster map request signal. The map request processor 23 does not always transmit the corrected position information (each time the corrected position information is generated). The map request processor 23 transmits the corrected position information when the map display processor 24 transmits the raster map request signal.

The route search request processor 25 transmits a route search request signal to the server 31 via the communication portion 17 to request the server 31 to perform a process that searches for a route. In this case, the route search request processor 25 attaches destination information to the route search request signal. The destination information indicates the GPS information and a destination specified in the navigation apparatus 11.

The following describes the server 31 that distributes map data to the map display apparatus. The server 31 includes a control circuit 32, a communication portion 33, a map data storage portion 34, and a storage portion 35. The control circuit 32 mainly includes a microcomputer including a CPU, ROM, and RAM (unshown). The control circuit 32 controls entire operation of the server 31. The control circuit 32 performs a control program in the CPU to virtually implement a GPS information reception processor 41a, a course prediction processor 41, a course data transmission processor 42, a map data distribution processor 43, a raster map data generation processor 44, and a route search processor 45 based on the software. The GPS information reception processor 41a, the course prediction processor 41, the course data transmission processor 42, the map data distribution processor 43, the raster map data generation processor 44, and the route search processor 45 may be implemented as hardware such as an integrated circuit integrated with the control circuit 32.

The communication portion 33 includes a wireless communication module. The communication portion 33 establishes a wireless communication line with the navigation apparatus 11 and performs various communications with the navigation apparatus 11 using the communication line. The map data storage portion 34 uses a large-capacity storage and stores vector map data as map data. The raster map data generation processor 44 can generate raster map data from vector map data by performing rasterization (imaging process). The server 31 can distribute vector map data or raster map data to the navigation apparatus 11. The server 31 may previously store raster map data in the map data storage portion 34. This eliminates a process that allows the raster map data generation processor 44 to generate raster map data, improving a processing speed.

The vector map data provides map data used for computation to display a map based on vector-form data. The vector map data contains various data needed to display a map in a vector form. The data includes: road data (road network data) containing node information indicating a node included in a road and link information connecting nodes to each other; road type data indicating a road type (e.g., information indicating road types such as national road, prefectural road, expressway, ordinary road, branch road, or main road) of each link; road name data indicating a road name corresponding to each link; connection angle data indicating a connection angle between links; road width data indicating the width of a road corresponding to each link; road shape data indicating a shape (e.g., cross road or T-shaped intersection) of a road corresponding to each link; road regulation data indicating the content of regulation (e.g., one-way traffic, one-lane traffic, or closure) placed on a road corresponding to each link; mark data; map matching data; destination data; table data used to convert traffic information into road data; and position data (coordinate data) indicating each point on a map displayed based on the vector map data.

The link information can contain travel history data and date information. The travel history indicates the past travel history of a vehicle mounted with the navigation apparatus 11. The date information indicates the date when a road corresponding to each link was constructed. A road settled as a guidance route can contain route history data indicating that the road is settled as a guidance route. The navigation apparatus 11 transmits the travel history data and the route history data to the server 31 as needed. As will be described in detail later, the link information can contain a priority. A map display apparatus such as the navigation apparatus 11 can specify the position or the shape of a road on the map based on the road data.

The raster map data is used to display a map as an image and contains bitmap image data, for example. The raster map data does not contain data comparable to road data contained in the vector map data. The server 31 can attach data comparable to road data to the raster map data.

The storage portion 35 includes a large-capacity storage such as a hard disk drive. The storage portion 35 includes a GPS information storage portion 35a, a course data storage portion 35b, a raster map data storage portion 35c, and a route data storage portion 35d, namely, storage portions (storage areas) corresponding to various types of data. The GPS information storage portion 35a stores GPS information received from the navigation apparatus 11. As will be described in detail later, the course data storage portion 35b stores course data. The raster map data storage portion 35c stores raster map data generated by the raster map data generation processor 44. As will be described in detail later, the route data storage portion 35d stores route data.

The GPS information reception processor 41a receives GPS information transmitted from the navigation apparatus 11 via the communication portion 33. The information storage portion 35a stores the received GPS information.

The course prediction processor 41 corresponds to a course prediction device or means. The course prediction processor 41 predicts a subsequent course of the navigation apparatus 11, namely, a course of the vehicle mounted with the navigation apparatus 11 based on the GPS information received from the navigation apparatus 11. The course prediction processor 41 settles the course as a predicted course. Various methods may be used to predict a course.

The route search processor 45 searches for a route when the course prediction processor 41 receives a route search request signal from the navigation apparatus 11. The searched route may be used as a subsequent course to be predicted. The route search processor 45 searches for a route based on the GPS information and the destination information received from the navigation apparatus 11 and the vector map data stored in the map data storage portion 34. The route to be searched ranges from a starting point specified by the GPS information to a goal specified by the destination information.

The course prediction processor 41 generates a progress situation of the navigation apparatus 11, namely, vector data indicating the vehicle's progress situation based on several GPS informations received from the navigation apparatus 11. The course prediction processor 41 may predict a subsequent course based on the vector data. The course prediction processor 41 may receive the GPS information and travel history information indicating the past travel history from the navigation apparatus 11. The course prediction processor 41 may predict a subsequent course based on the travel history information. For example, the travel history indicates of which roads at an intersection the vehicle traveled. Alternatively, the travel history indicates of which possible routes the vehicle traveled.

The course prediction processor 41 may receive the GPS information and destination information indicating a destination for the route guidance from the navigation apparatus 11. A guidance route can be settled based on the GPS information and the destination information. The course prediction processor 41 may configure the guidance route as a subsequent course. In this case, the navigation apparatus 11 may transmit guidance route information indicating the settled guidance route to the server 31. A guidance route can be specified based on the guidance route information. The server 31 may configure the guidance route as a subsequent course. While there have been outlined examples of the course prediction method, specific examples will be described in detail later.

Figure 2:
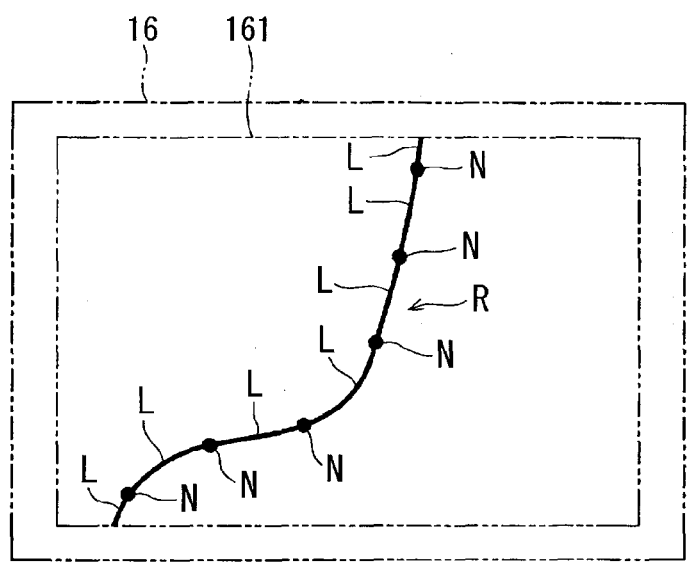
FIG. 2 is a diagram illustrating course data.

The course data transmission processor 42 corresponds to a course data transmission device or means. The course data transmission processor 42 generates course data indicating a predicted course predicted by the course prediction processor 41 and transmits the course data to the navigation apparatus 11 via the communication portion 33. As in FIG. 2, the course data contains node information, link information, and shape point information. The node information indicates node N contained in predicted course R. The link information indicates link L connecting nodes to each other. The shape point information indicates the predicted course. Based on the course data, a map display apparatus such as the navigation apparatus 11 can specify a position or a shape of predicted course R on a screen 161 of the display portion 16. FIG. 2 illustrates the display portion 16 and the screen 161 using imaginary lines.

The map data distribution processor 43 corresponds to a map data distribution device or means. The map data distribution processor 43 specifies a corrected position (coordinates of the corrected position) based on the corrected position information received from the navigation apparatus 11. The map data distribution processor 43 also specifies a map display content (e.g., position or scale of a map to be displayed) in the navigation apparatus 11 based on various informations received from the navigation apparatus 11. The map data distribution processor 43 extracts map data corresponding to a specified area containing the corrected position or map data corresponding to the map display content from the raster map data storage portion 35c. The map data distribution processor 43 distributes the extracted map data to the navigation apparatus 11 via the communication portion 33. The raster map data storage portion 35c may not contain relevant map data. In such a case, the map data distribution processor 43 transmits a map generation request signal to the map display processor 24. When receiving the map generation request signal, the map display processor 24 can generate a necessary map (raster map data) from vector map data stored in the storage unit 15 based on the rasterization.

Figure 3:
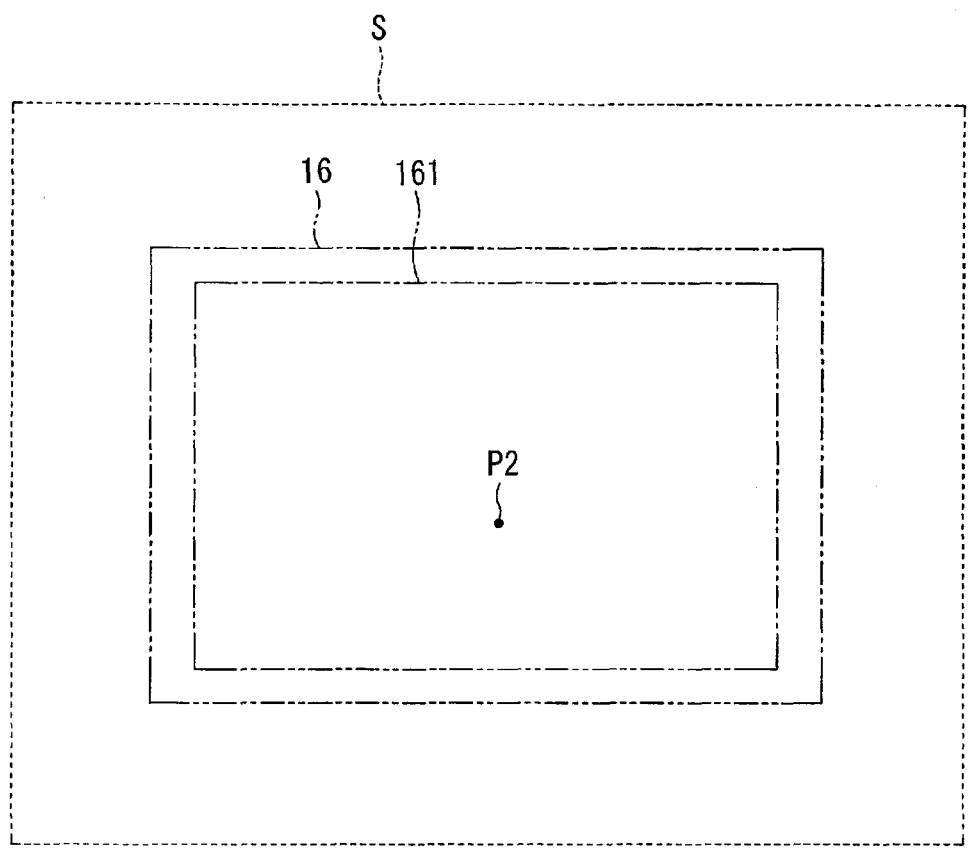
FIG. 3 is a diagram illustrating relationship between the size of a screen on a display portion and the size of an area capable of displaying extracted raster map data.

FIG. 3 illustrates area S using a dotted line as a specified area containing corrected position P2. Area S is larger than the screen 161 of the display portion 16. The screen 161 is specified by the screen size specification information received from the navigation apparatus 11. The map data distribution processor 43 extracts raster map data corresponding to area S from the raster map data storage portion 35c and distributes the raster map data to the navigation apparatus 11. The size of area S can be changed as needed as far as the size is larger than the screen 161. FIG. 3 illustrates the display portion 16 and the screen 161 using imaginary lines.

Figure 4:
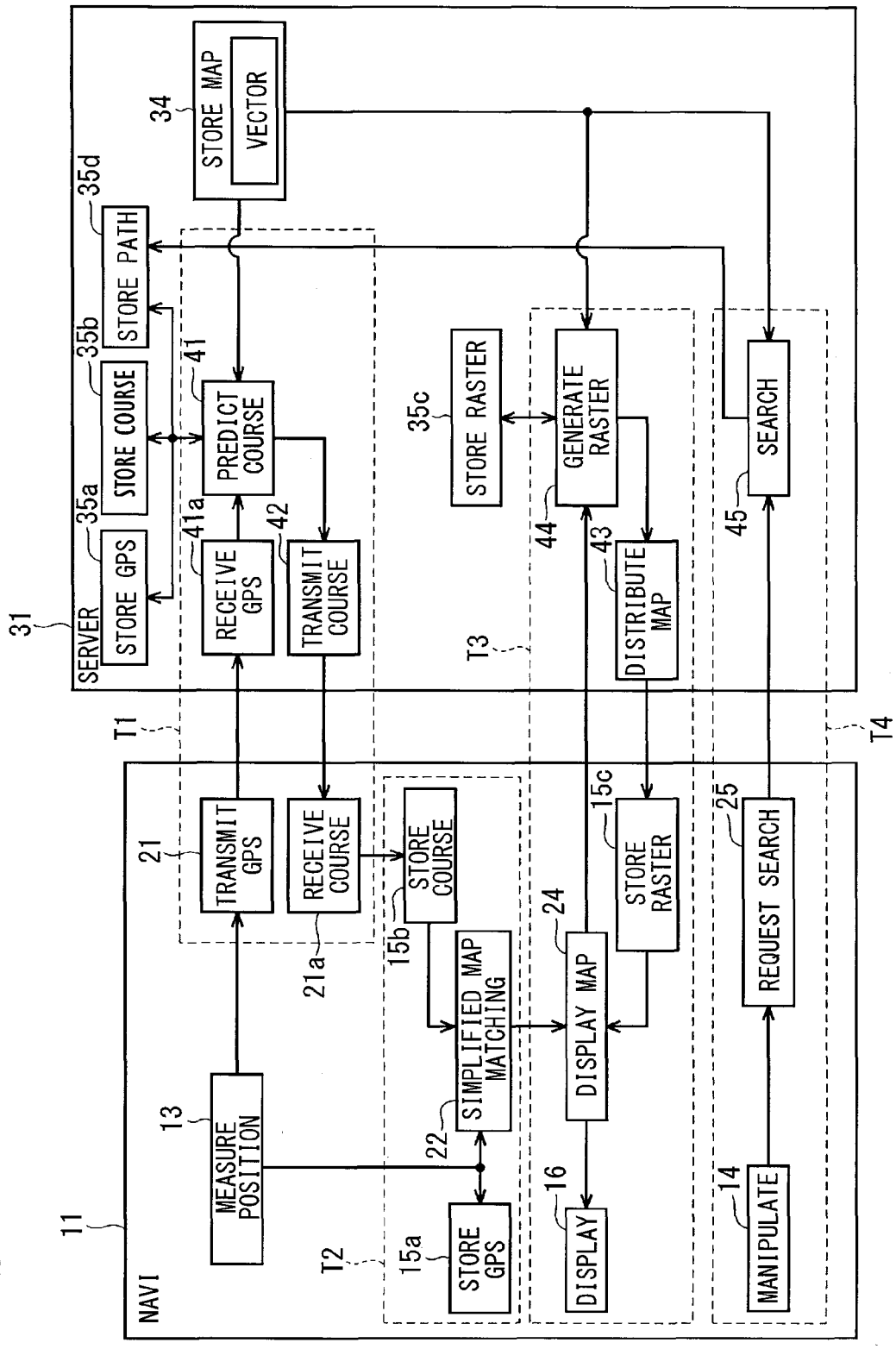
FIG. 4 is a functional block diagram illustrating a configuration of the map display system in association with tasks.

With reference to FIG. 4, the following more specifically describes the configuration of the map display system 10 in association with tasks. As in FIG. 4, the map display system 10 can perform position acquisition/course prediction task T1, simplified map matching task T2, map display task T3, and route search task T4 based on the configuration. Position acquisition/course prediction task T1 includes position acquisition task T1a and course prediction task T1b (see FIG. 12). Map display task T3 includes map drawing task T3a and raster map generation task T3b (see FIG. 13).

The GPS information transmission processor 21, the course data reception processor 21a, the GPS information reception processor 41a, the course prediction processor 41, and the course data transmission processor 42 implement position acquisition/course prediction task T1. The navigation apparatus 11 allows the GPS information transmission processor 21 to transmit GPS information to the server 31. The server 31 allows the GPS information reception processor 41a to receive the GPS information. The server 31 allows the course prediction processor 41 to predict a course based on the received GPS information. The server 31 allows the course data transmission processor 42 to transmit course data of the predicted course to the navigation apparatus 11. The server 31 predicts a course while referencing various types of data such as vector map data stored in the map data storage portion 34. The navigation apparatus 11 allows the course data reception processor 21a to receive the course data and stores the received course data in the course data storage portion 15b. The server 31 stores the received GPS information in the GPS information storage portion 35a. The server 31 stores the predicted course data in the course data storage portion 35b.

The simplified map matching processor 22 implements simplified map matching task T2. The navigation apparatus 11 performs the simplified map matching process based on the GPS information stored in the GPS information storage portion 15a and the course data stored in the course data storage portion 15b.

The map display processor 24, the raster map data generation processor 44, and the map data distribution processor 43 implement map display task T3. The raster map data storage portion 15c may not contain raster map data corresponding to a map near the corrected position. In such a case, the navigation apparatus 11 transmits a raster map request signal and corrected position information to the server 31. When receiving the raster map request signal, the server 31 extracts raster map data corresponding to the map near the corrected position specified by the received corrected position information from the raster map data storage portion 35c. Alternatively, the server 31 allows a raster map generation portion 44 to newly generate raster map data corresponding to the map near the corrected position. To newly generate raster map data, the server 31 generates the raster map data from vector map data stored in the map data storage portion 34. The server 31 allows the map data distribution processor 43 to distribute the extracted or generated raster map data to the navigation apparatus 11. The navigation apparatus 11 stores the distributed raster map data in the raster map data storage portion 15c. The navigation apparatus 11 allows the display portion 16 to display the map based on the raster map data stored in the raster map data storage portion 15c. The server 31 stores the generated raster map data in the raster map data storage portion 35c.

The route search request processor 25 and the route search processor 45 implement route search task T4. The navigation apparatus 11 may request a route search according to manipulation on the manipulation portion 14. In such a case, the navigation apparatus 11 allows the route search request processor 25 to transmit a route search request signal to the server 31 and transmits the GPS information and the destination information to the server 31. When receiving the route search request signal, the server 31 allows the route search processor 45 to search for a route based on the GPS information and the destination information that are received. The server 31 searches for a route while referencing various data such as vector map data stored in the map data storage portion 34. The server 31 stores route data indicating the searched route in the route data storage portion 35d. This enables the course prediction processor 41 to predict a course based on the route data stored in the route data storage portion 35d, namely, based on the route searched by the route search processor 45.

The following describes operation of the map display system 10.

(Course Prediction Process)

Figure 5:
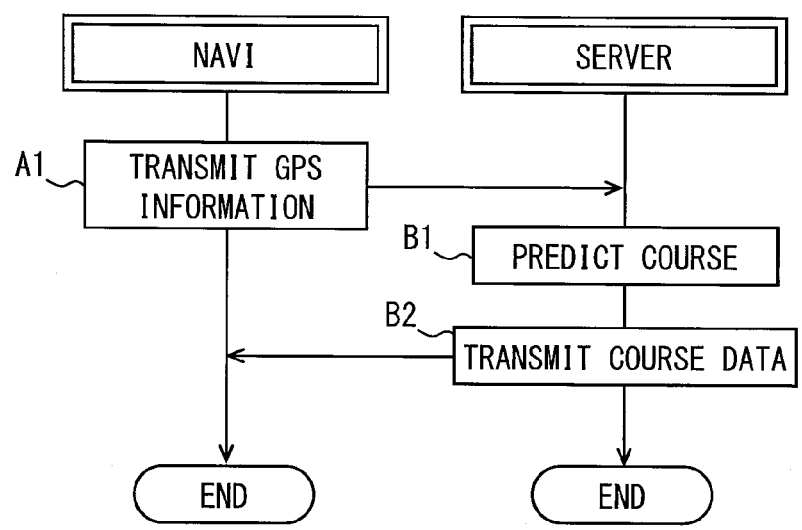
FIG. 5 is a flowchart illustrating a course prediction process.

As in FIG. 5, the navigation apparatus 11 transmits GPS information outputted from the position measuring portion 13 to the server 31 as needed (step A1). The timing for the navigation apparatus 11 to transmit GPS information can be changed as needed. The navigation apparatus 11 may transmit GPS information each time the position measuring portion 13 measures the current position. Alternatively, the navigation apparatus 11 may store GPS information outputted from the position measuring portion 13 and transmit a predetermined number of GPS informations at a time.

The server 31 predicts a course based on the GPS information received from the navigation apparatus 11 (step B1). The server 31 generates course data indicating the predicted course and transmits the course data to the navigation apparatus 11 (step B2).

(Map Data Distribution Process)

Figure 6:
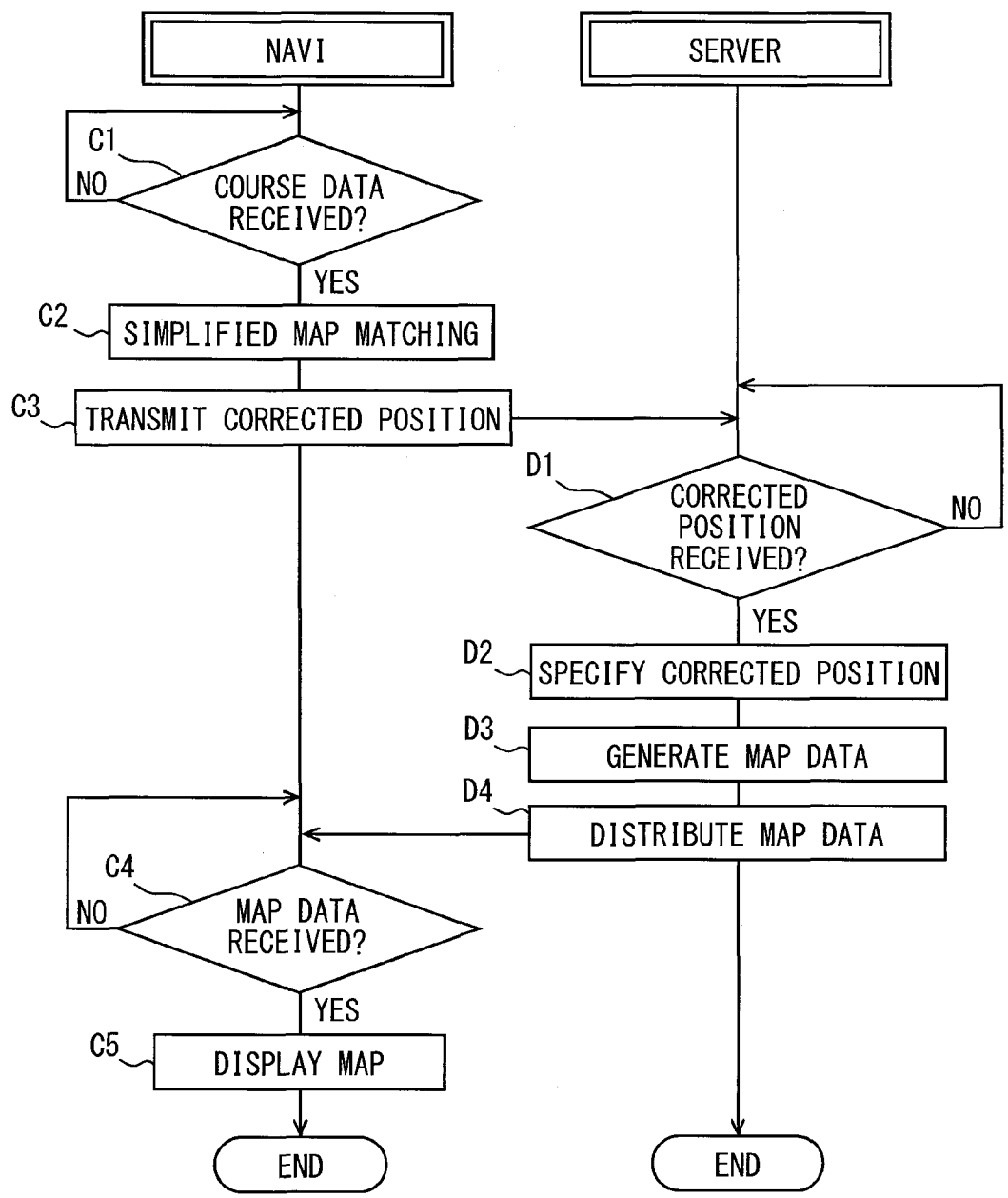
FIG. 6 is a flowchart illustrating a map data distribution process.

As in FIG. 6, the navigation apparatus 11 monitors whether or not course data is received from the server 31 (step C1) while transmitting the GPS information during the course prediction process (see step A1). If receiving course data from the server 31 (step C1: YES), the navigation apparatus 11 performs the simplified map matching process (step C2).

Figure 7:
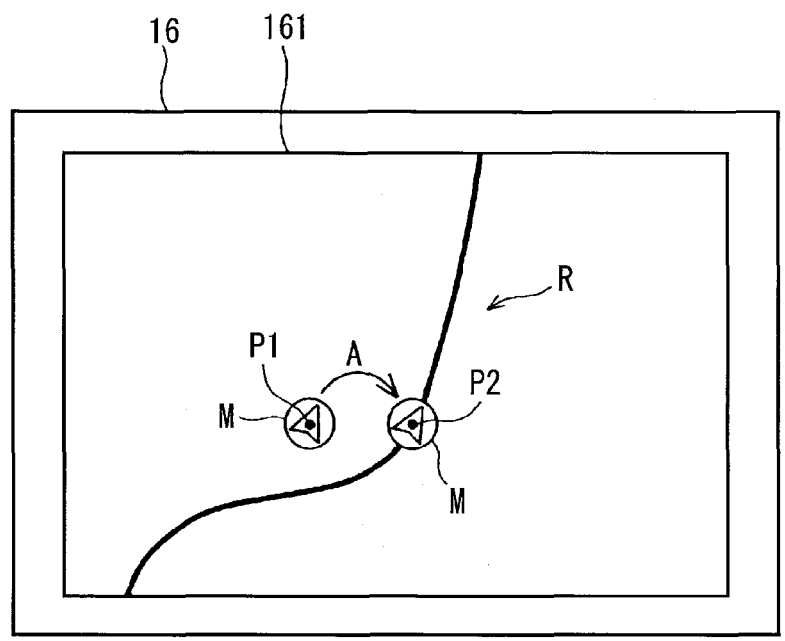
FIG. 7 is a diagram illustrating correction of a current position based on a simplified map matching process.

After receiving the course data, the navigation apparatus 11 performs the simplified map matching process as in FIG. 7, which corrects current position P1 measured by the position measuring portion 13 to a position on predicted course R specified by the received course data as indicated by arrow A in FIG. 7. The navigation apparatus 11 can specify the position or the shape of predicted course R on the screen 161 of the display portion 16 based on the course data. The navigation apparatus 11 moves current position P1 to a coordinate position overlapping with specified predicted course R and settles current position P1 as corrected position P2. The simplified map matching process corrects the current position to any position on the predicted course specified based on course data that is not contained in the map data. The simplified map matching process corrects the current position regardless of the map. The simplified map matching process differs from a general map matching process that corrects the current position to any position on a road specified based on road data contained in the map data in association with the map. The simplified map matching process may or may not display a map on the screen 161.

The navigation apparatus 11 corrects the position to corrected position P2 on the predicted course using the simplified map matching process, and then transmits corrected position information indicating the corrected position P2 to the server 31 (step C3). The navigation apparatus 11 monitors whether or not raster map data is received from the server 31 (step C4).

The server 31 transmits the course data during the course prediction process (see step B2) and then monitors whether or not the corrected position information is received from the navigation apparatus 11 (step D1). If receiving the corrected position information from the navigation apparatus 11 (step D1: YES), the server 31 specifies corrected position P2 based on the corrected position information as in FIG. 3 (step D2). The server 31 extracts the raster map data corresponding to area S including or near corrected position P2 from the raster map data storage portion 35c or newly generates the raster map data from vector map data in the map data storage portion 34 (D3). The server 31 distributes the extracted raster map data to the navigation apparatus 11 (D4).

Figure 8:
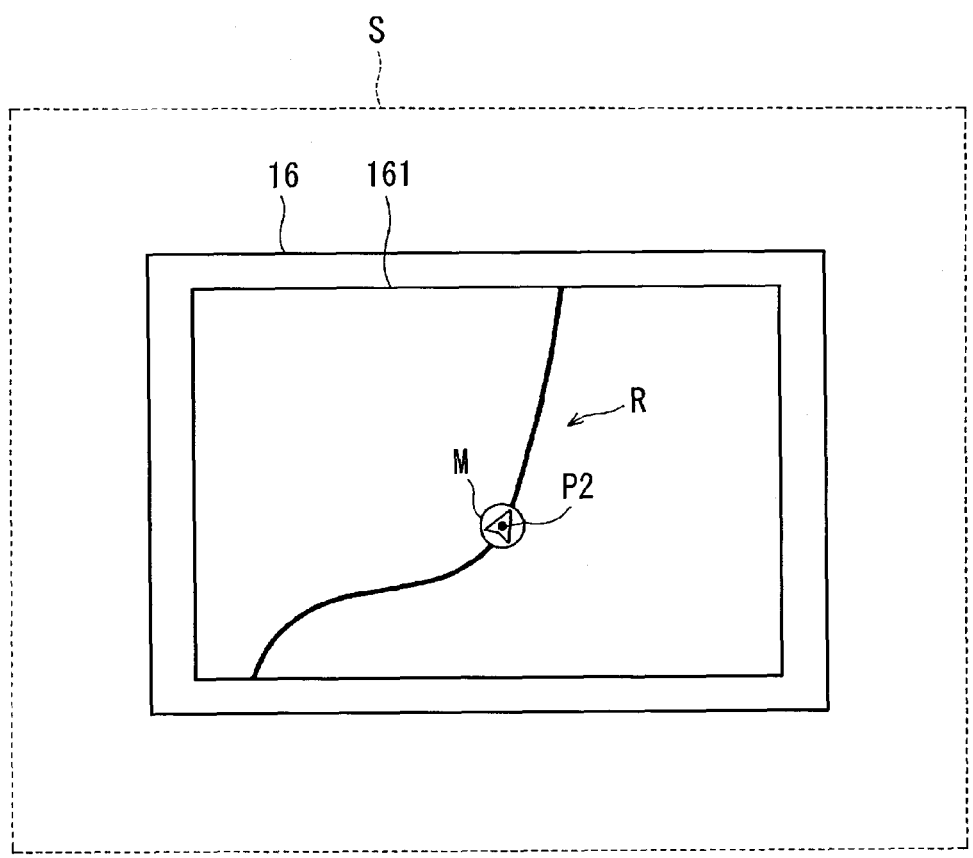
FIG. 8 is a diagram illustrating a map displayed based on raster map data.

If receiving raster map data from the server 31 (step C4: YES), the navigation apparatus 11 displays an image as a map, namely, a map image on the screen 161 of the display portion 16 based on the raster map data as in FIG. 8 (step C5). The navigation apparatus 11 displays the map near corrected position P2 and displays current position mark M positioned to corrected position P2. Corrected position P2 is positioned on predicted course R. Therefore, current position mark M is displayed so as to overlap with a road that belongs to roads on the map and is predicted as predicted course R. The drawings omit roads other than predicted course R. The screen 161 displays the map as an image based on the raster map data.

Figure 9:
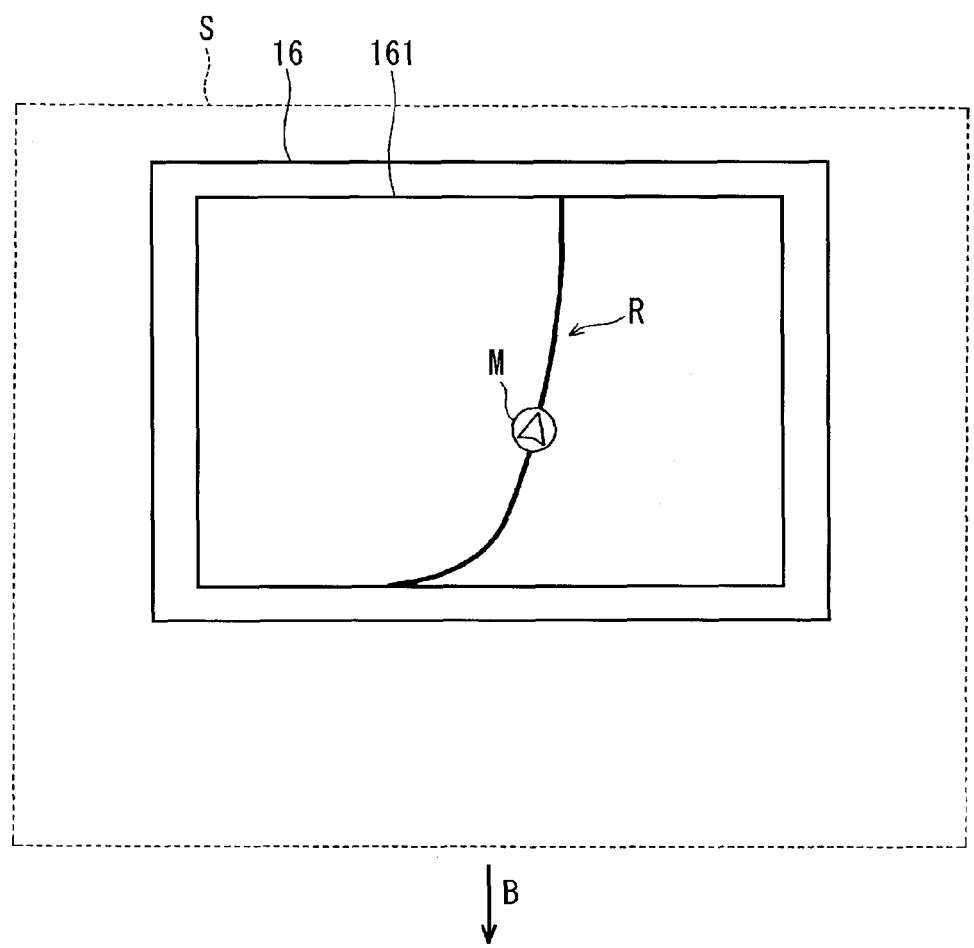
FIG. 9 is a diagram illustrating a state of scrolling a map.

As the vehicle's current position moves, the navigation apparatus 11 scrolls the map displayed on the screen 161 as indicated by arrow B in FIG. 9 using the raster map data received from the server 31. As the vehicle travels, the navigation apparatus 11 moves the display position of current position mark M corresponding to the current position measured at the time. The navigation apparatus 11 displays current position mark M at a position indicated by position data (coordinate data) contained in the raster map data until the measured current position deviates from area S. The navigation apparatus 11 continues to scroll the map and move the current position mark M while performing the general map matching process that corrects the current position associated with the map.

Figure 10:
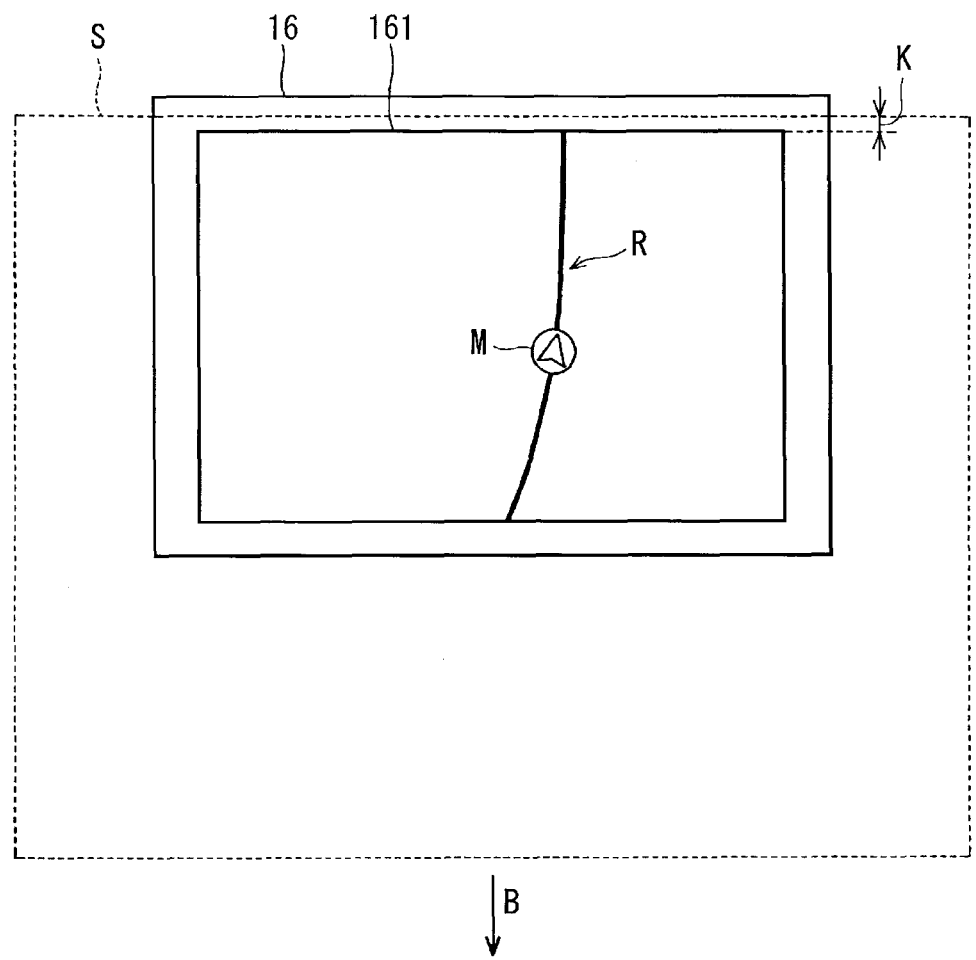
FIG. 10 is a diagram illustrating the current position going to disappear from an area corresponding to the raster map data.

As in FIG. 10, the navigation apparatus 11 determines that the current position is going to deviate from area S when the end (upper end in this case) of area S is going to reach the end (upper end in this case) of the screen 161, namely, when the length between the upper end of area S and the upper end of the screen 161 equals reference value K or smaller. The navigation apparatus 11 proceeds to the ongoing course prediction process at step A1, namely, the process to transmit the GPS information to the server 31. The size of reference value K can be changed as needed.

Afterward, the server 31 predicts a new course. The navigation apparatus 11 corrects the current position on the new predicted course. The server 31 distributes new raster map data corresponding to the vicinity of the corrected position to the navigation apparatus 11. Suppose the current position of the navigation apparatus 11, namely, the vehicle's current position is going to deviate from area S. In this case, the server 31 additionally distributes new raster map data to display a map near the current position at the time.

Figure 11:
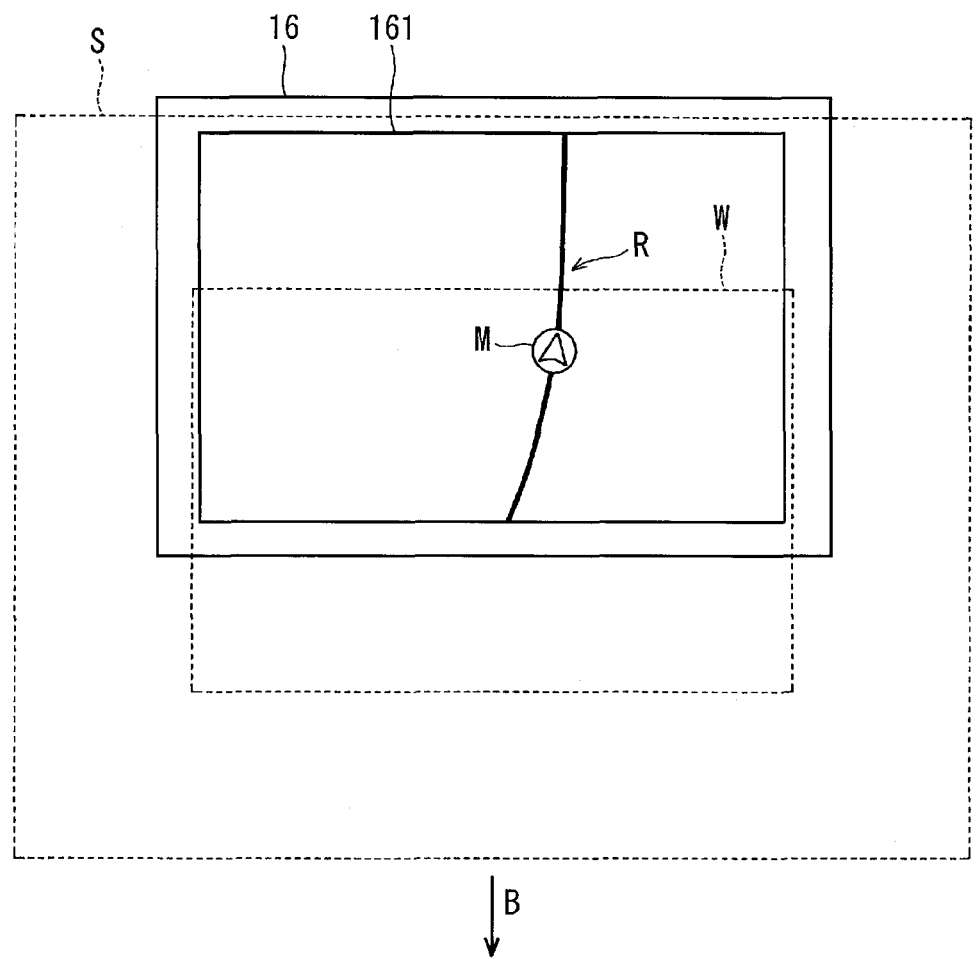
FIG. 11 illustrates a diagram comparable to FIG. 10 according to a modification.

Various methods may be used to determine whether or not the current position is going to deviate from area S. For example, a method in FIG. 11 provides reference frame W for determination inside area S and determines that the current position is going to deviate from area S when the current position reaches reference frame W.

Figure 12:
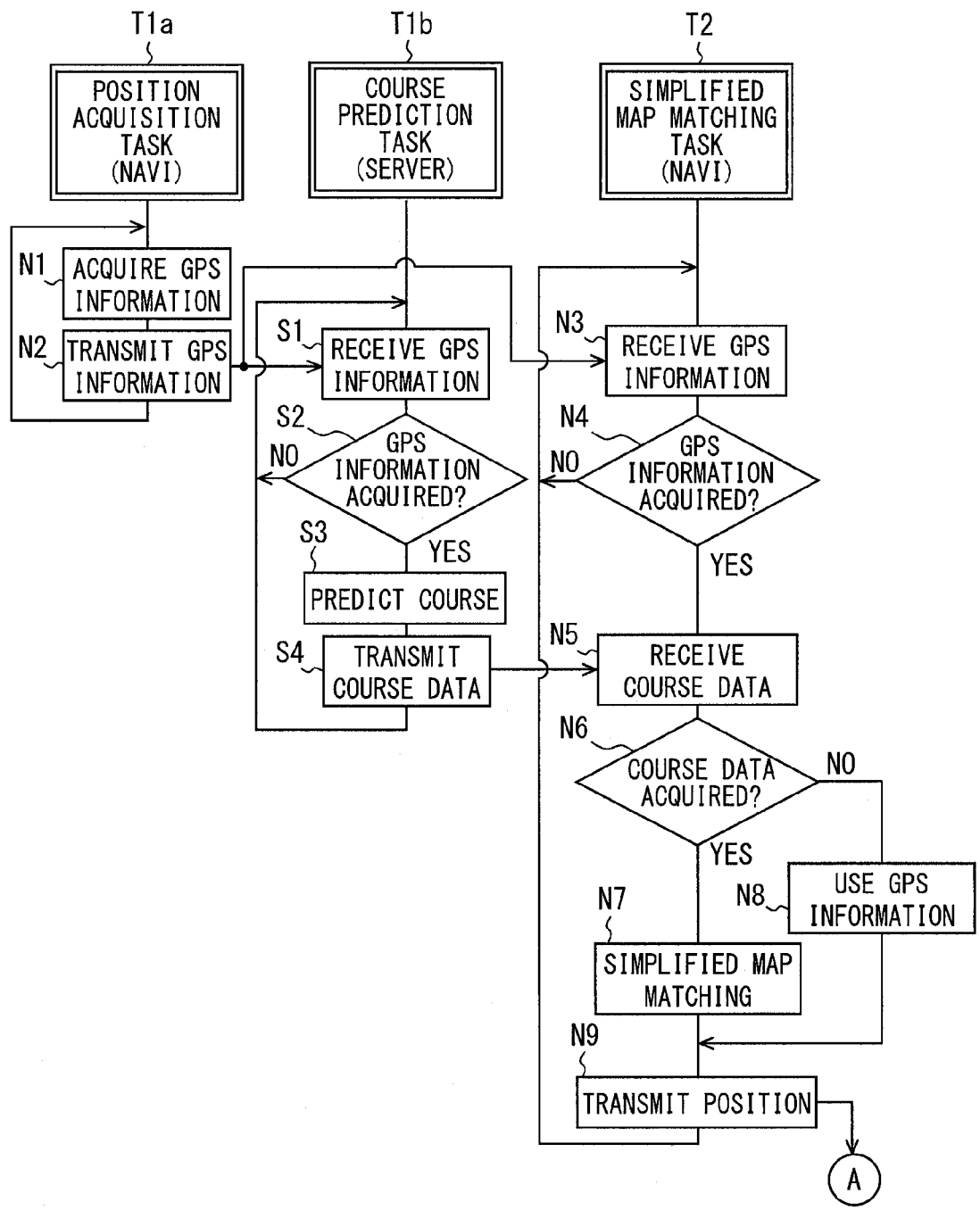
FIG. 12 is a flowchart illustrating operation of the map display system along a flow of tasks (1)
Figure 13:
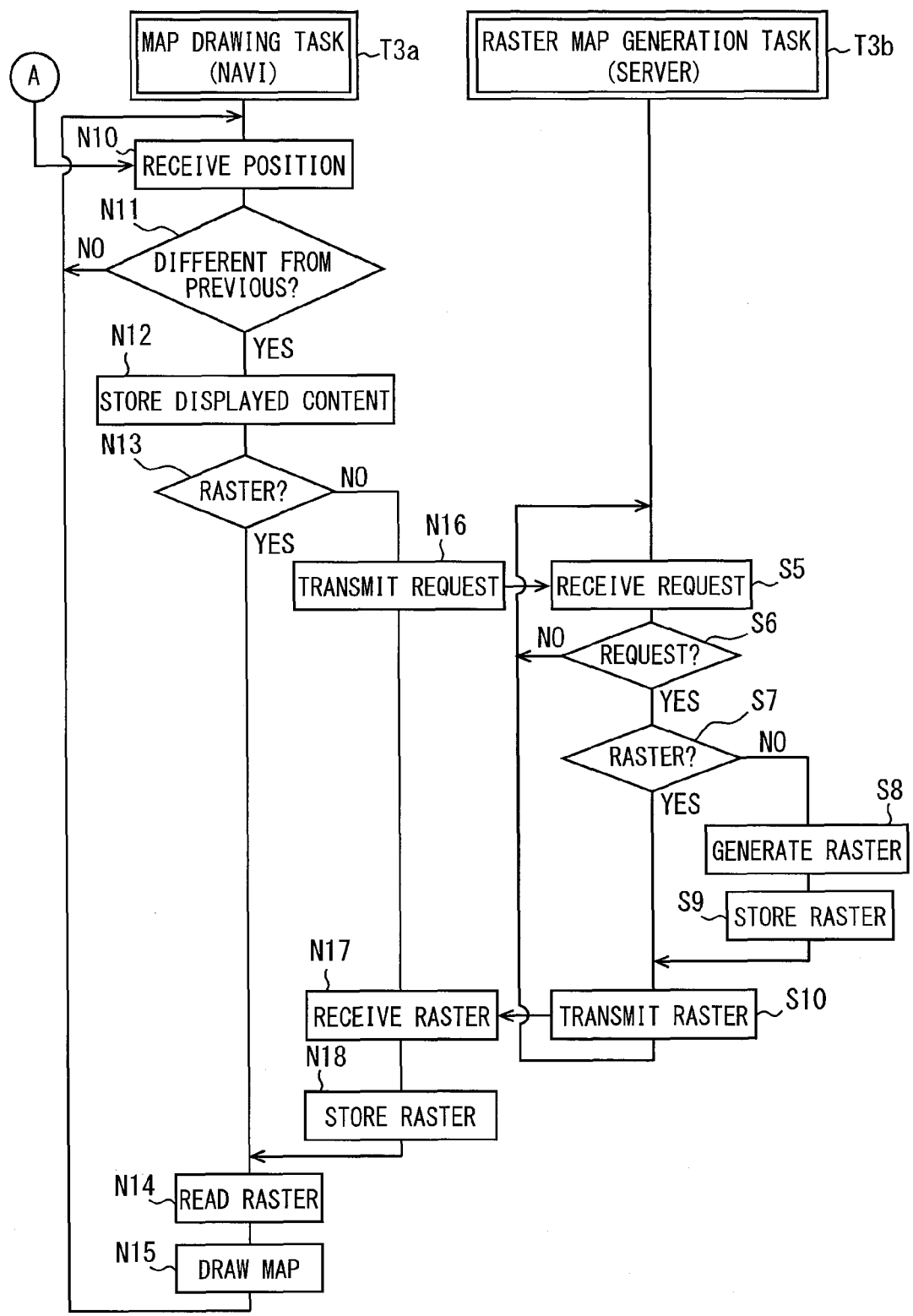
FIG. 13 is a flowchart illustrating operation of the map display system along a flow of tasks (2)

With reference to FIGS. 12 and 13, the following describes operation of the map display system 10 along flows of tasks that are performed concurrently with each other. As in FIG. 12, position acquisition task T1a performed on the navigation apparatus 11 repeatedly performs the process to acquire GPS information (step N1) and the process to transmit GPS information (step N2). The GPS information transmission process supplies GPS information to course prediction task T1b performed on the server 31 and simplified map matching task T2 performed on the navigation apparatus 11.

Course prediction task T1b performs a process to receive the GPS information (step S1). If receiving the GPS information from position acquisition task T1a (step S2: YES), course prediction task T1b performs the course prediction process (step S3). Course prediction task T1b supplies course data of the predicted course to simplified map matching task T2 performed on the navigation apparatus 11 (step S4).

Simplified map matching task T2 performs a process to receive the GPS information (step N3) and a process to receive the course data (step N5). Simplified map matching task T2 may receive the GPS information from position acquisition task T1a (step N4: YES) and may receive the course data from course prediction task T1b (step N6: YES). In this case, simplified map matching task T2 performs the simplified map matching process (step N7). Simplified map matching task T2 supplies the vehicle's position information (vehicle position information indicating the vehicle position) after the map matching (correction) to map drawing task T3a performed on the navigation apparatus 11 (step N9). The vehicle position information to be supplied signifies the position information that indicates the corrected position corrected by the simplified map matching process.

The simplified map matching process is not performed if simplified map matching task T2 does not receive course data from course prediction task T1b (step N6: NO). In this case, simplified map matching task T2 uses the GPS information received at N3 as the vehicle position information and supplies the GPS information to map drawing task T3a (steps N8 and N9).

As in FIG. 13, map drawing task T3a performs a process to receive the vehicle position information (step N10). When receiving the vehicle's position information, map drawing task T3a determines whether or not the display content (the map to be displayed) differs from the previous content (the map displayed by the previous task process) (step N11). If the display content differs from the previous content (step N11: YES), map drawing task T3a stores information about the display content (e.g., coordinate information about the vehicle position or a map scale) in a display content storage portion (unshown) of the storage unit 15 (step N12). Map drawing task T3a determines whether or not the raster map data storage portion 15c contains raster map data corresponding to the map to be displayed (step N13). If the raster map data storage portion 15c contains raster map data corresponding to the map to be displayed (step N13: YES), map drawing task T3a reads the raster map data from the raster map data storage portion 15c (step N14). Map drawing task T3a draws the map on the display portion 16 based on the raster map data (step N15).

If the raster map data storage portion 15c does not contain raster map data corresponding to the map to be displayed (step N13: NO), map drawing task T3a performs a process to transmit a raster map request signal (step N16). The transmission process supplies the raster map request signal to raster map generation task T3b performed on the server 31.

Raster map generation task T3b performs a process to receive the raster map request signal (step S5). If receiving the raster map request signal (step S6: YES), raster map generation task T3b determines whether or not the raster map data storage portion 35c contains the raster map data requested by the signal (step S7). If the raster map data storage portion 35c contains the requested raster map data (step S7: YES), raster map generation task T3b reads the raster map data from the raster map data storage portion 35c and supplies the raster map data to map drawing task T3a (step S10).

If the raster map data storage portion 35c does not contain the requested raster map data (step S7: NO), raster map generation task T3b newly generates the raster map data (step S8) and stores the raster map data in the raster map data storage portion 35c (step S9). Raster map generation task T3b reads the raster map data from the raster map data storage portion 35c and supplies the raster map data map drawing task T3a (step S10).

Map drawing task T3a transmits the raster map request signal and then performs a process to receive raster map data (step N17). When receiving the raster map data from raster map generation task T3b, map drawing task T3a stores the raster map data in the raster map data storage portion 15c (step N18). Map drawing task T3a reads the raster map data from the raster map data storage portion 15c (step N14) and draws a map on the display portion 16 based on the raster map data (step N15).

The following describes specific modifications of the course prediction process on the server 31. The course prediction process is performed on the server 31. The drawings concerning the following description illustrate the display portion 16 and the screen 161 using imaginary lines.

Figure 14:
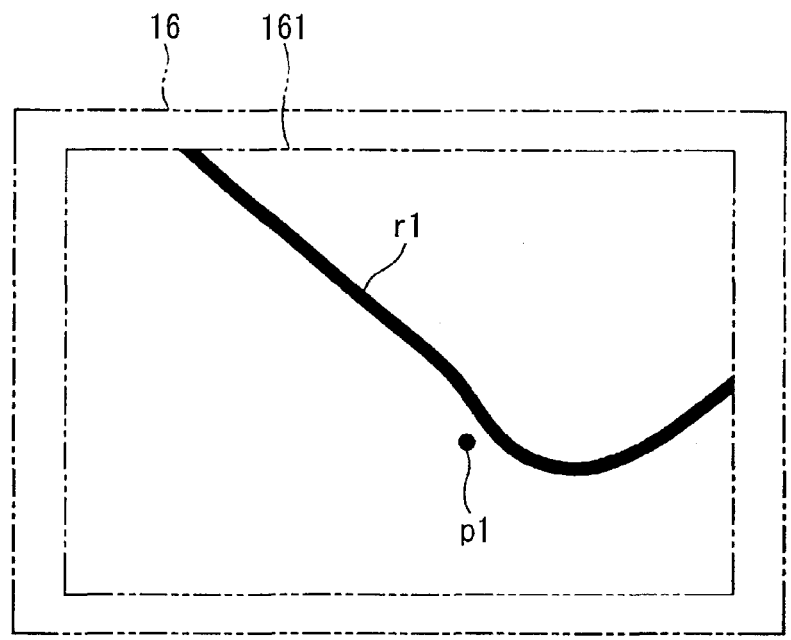
FIG. 14 is a diagram illustrating a modification of the course prediction process (1)

FIG. 14 illustrates a case of predicting a course based on one GPS information (vehicle position information). Road r1 is nearest to point p1 specified by the GPS information. The server 31 can settle road r1 as a predicted course.

Figure 15:
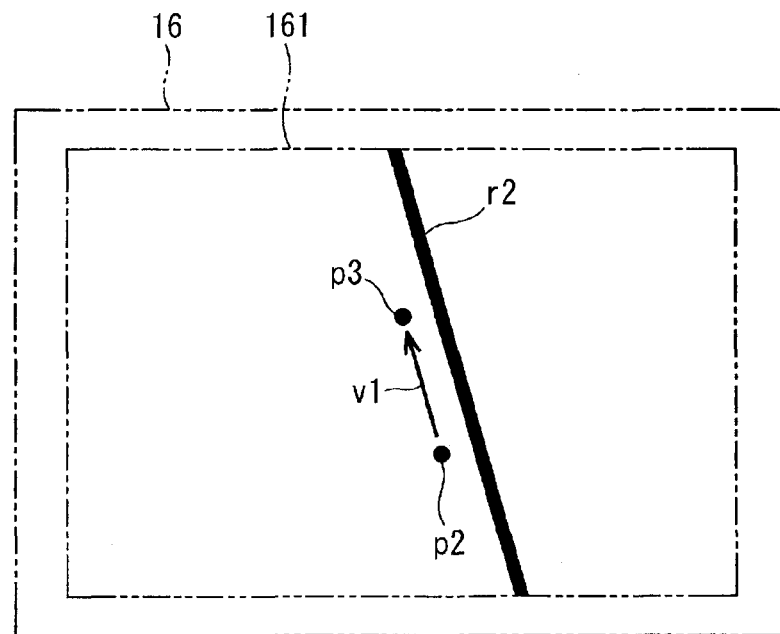
FIG. 15 is a diagram illustrating a modification of the course prediction process (2)

FIG. 15 illustrates a case of predicting a course based on several GPS informations (two informations in FIG. 15). The server 31 computes vector v1 (course vector) that connects point p2 with point p3 specified by the GPS informations. Road r2 exists near course vector v1 (points p2 and p3 included in course vector v1) and extends along (in parallel to) course vector v1. The server 31 can settle road r2 as a predicted course.

Figure 16:
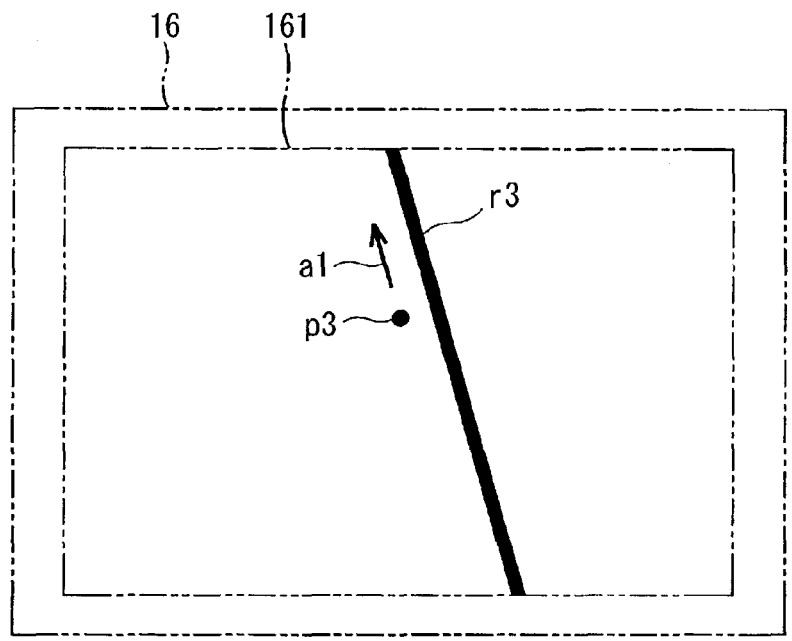
FIG. 16 is a diagram illustrating a modification of the course prediction process (3)
Figure 17:
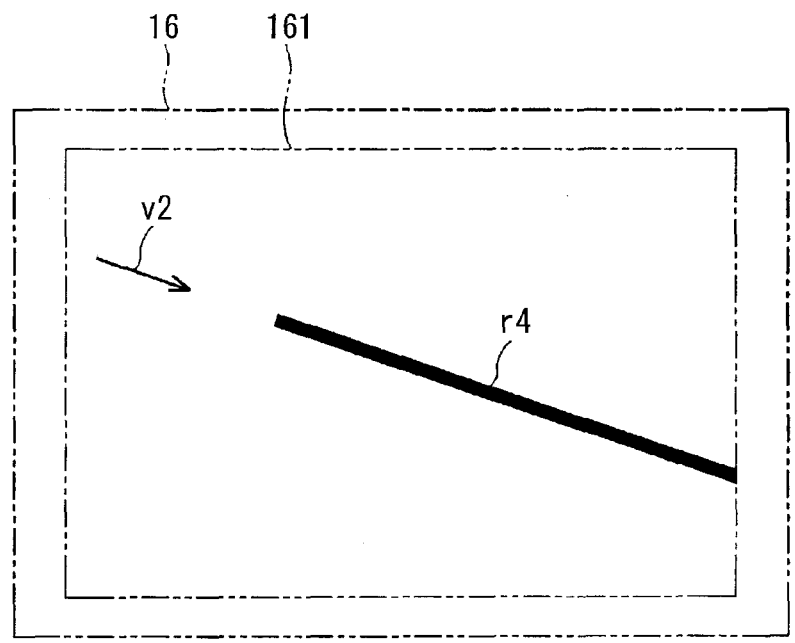
FIG. 17 is a diagram illustrating a modification of the course prediction process (4)

A combination of position data and angle data contained in the GPS information may settle a predicted course. An example in FIG. 16 illustrates road r3 that exists near point p3 specified by the position data and extends in vehicle's traveling direction al specified by the angle data. The server 31 settles road r3 as a predicted course. FIG. 17 illustrates road r4 containing a link that is specified ahead of the traveling direction corresponding to computed course vector v2. The server 31 may settle road r4 as a predicted course.

Figure 18:
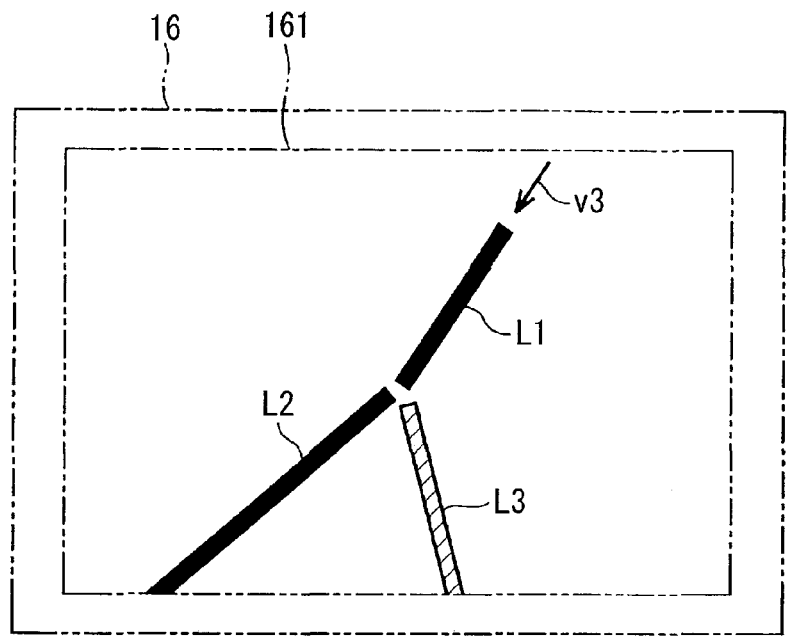
FIG. 18 is a diagram illustrating a modification of the course prediction process (5)

A predicted course may be settled with reference to road information. According to an example in FIG. 18, link L1 is specified based on computed course vector v3 and is defined as "national road." Link L1 is further branched into link L2 defined as "national road" and link L3 defined as "prefectural road." Link L2 belongs to the same road type "national road" as link L1 and is settled as a predicted link. Links L1 and L2 form a road. The server 31 settles this road as a predicted course. Although "road type" is used as road information in FIG. 18, the predicted course may be settled using other road information such as "road name," "connection angle" between links, and "road width." The predicted course may be settled based on single road information or different road informations.

Figure 19:
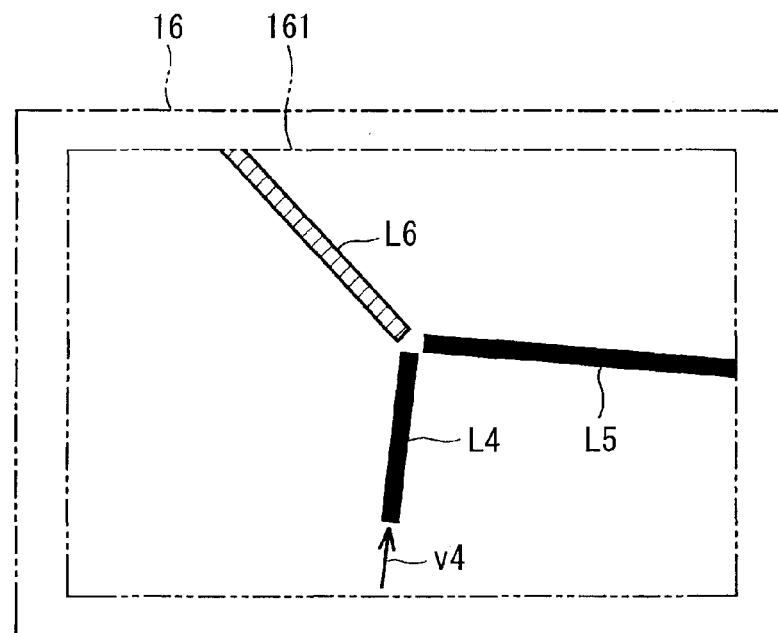
FIG. 19 is a diagram illustrating a modification of the course prediction process (6)

The predicted course may be settled with reference to past travel history. According to an example in FIG. 19, link L4 is predicted based on computed course vector v4 and is followed by a road indicated by link L5 frequented in the past and another road indicated by link L6 that contains no travel history or fewer travel histories than link L5. The server 31 settles link L5 containing the travel history as a predicted link. The server 31 settles a road including links L4 and L5 as a predicted course.

Figure 20:
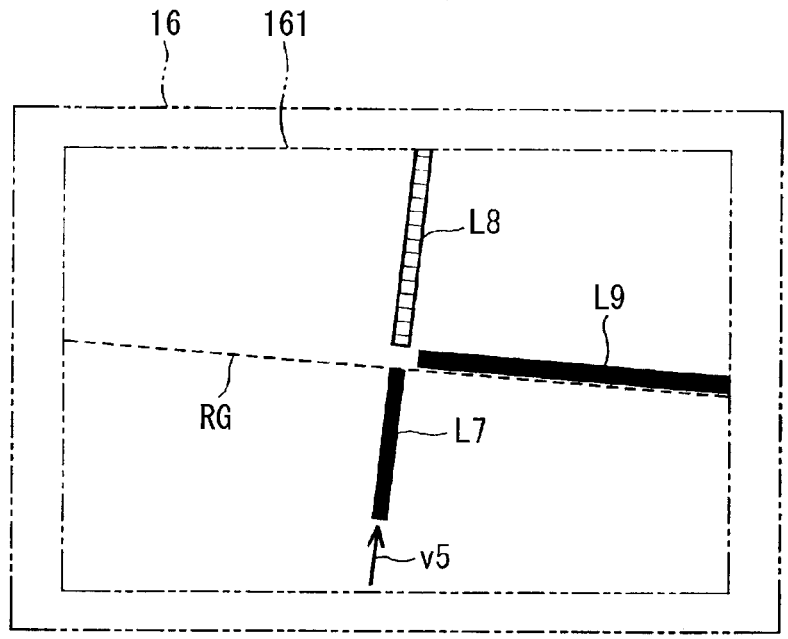
FIG. 20 is a diagram illustrating a modification of the course prediction process (7)

A predicted course may be settled based on a predetermined guidance route. According to an example in FIG. 20, link L7 is specified based on computed course vector v5 and is further connected with links L8 and L9. Guidance route RG is settled. The server 31 settles link L9 contained in guidance route RG as a predicted link. The server 31 settles a road including links L7 and L9 as a predicted course. When guidance route RG is settled in the navigation apparatus 11, the navigation apparatus 11 transmits data to specify guidance route RG to the server 31.

Figure 21:
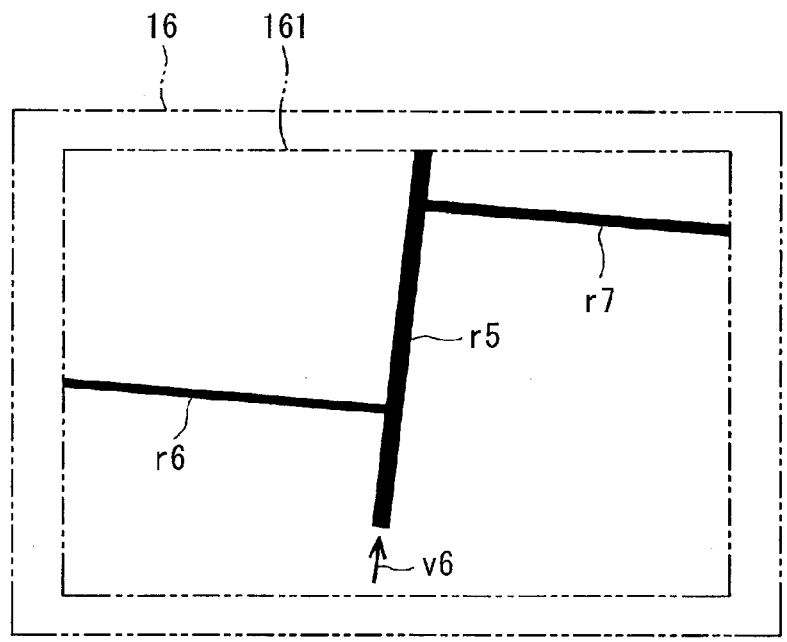
FIG. 21 is a diagram illustrating a modification of the course prediction process (8)

The server 31 can settle several predicted courses. According to an example in FIG. 21, a road extends straight along course vector v6. The server 31 settles this road as main predicted course r5. Other roads r6 and r7 are connected to predicted course r5. The server 31 also settles these roads as predicted courses. The vehicle may deviate from predicted course r5 and travel road r6 or r7. In such a case, the navigation apparatus 11 can appropriately perform the simplified map matching process because roads r6 and r7 are also predetermined as the predicted courses. Another road connected road r6 or r7 may be settled as a predicted course.

Figure 22:
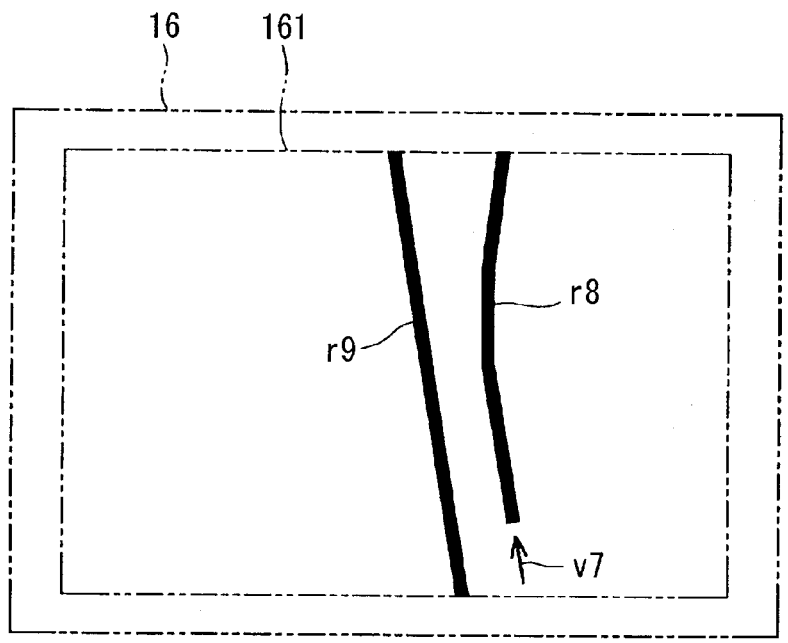
FIG. 22 is a diagram illustrating a modification of the course prediction process (9)

According to an example in FIG. 22, a road extends along course vector v7 in a straight direction. The server 31 settles this road as predicted course r8. Another road extends in parallel to predicted course r8. The server 31 also settles this road as predicted course r9. The road extending in parallel to predicted course r8 is assumed to be an expressway, for example. The navigation apparatus 11 can appropriately perform the simplified map matching process even if the vehicle changes from road r8 as an ordinary road to expressway r9.

Figure 23:
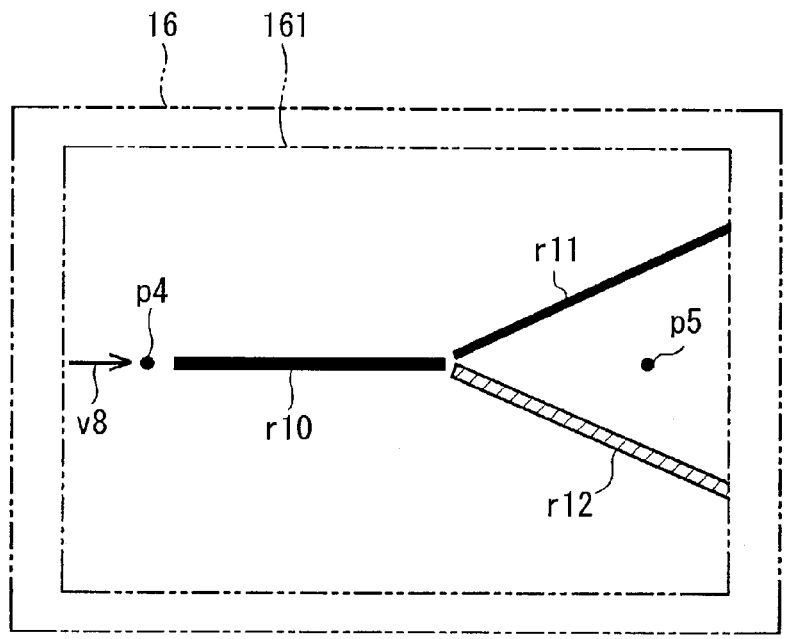
FIG. 23 is a diagram illustrating a modification of the course prediction process (10)

Different priorities may be assigned to roads at a branch point. The server 31 may settle a predicted course based on the priorities. According to an example in FIG. 23, predicted course r10 is settled based on course vector v8 and is followed by two roads r11 and r12 that each branch from predicted course r10 at the same angle. Suppose the vehicle's position information moves from point p4 to point p5. In this case, it is very difficult to determine whether the vehicle proceeds to road r11 or r12. To solve this issue, the server 31 predetermines a priority for each link to form a road. Based on travel histories in the past or road types, the server 31 supplies a high priority to a road the vehicle is highly likely to travel. The server 31 selects a more highly prioritized link (the link corresponding to road r11 in the example of FIG. 23) and settles a road including road r11 as a predicted course. Based on the probability, the server 31 can accurately estimate that the vehicle proceeds to road r11.

For example, the server 31 is capable of: applying a high priority to a road belonging to a route searched in the past (route history) or at the present; setting a priority of a straight road to be higher than a priority of a curved road; setting a priority based on a road name; increasing a priority as the road width increases; setting a priority of a main road to be higher than a priority of a branch road; and setting a priority using road regulation information such as applying a low priority to a no-entry road. Further, the server 31 is capable of: setting a priority using date information about the road construction such as applying a high priority to a newly constructed road; setting a priority based on a traffic situation acquired by communication with other vehicles such as applying a low priority to a busy road and applying a high priority to a quiet road; setting a priority based on the vehicle's travel speed (vehicle speed) such as applying a high priority to an expressway extending in parallel when the travel speed is higher than a specified speed; setting a priority based on a manipulation content in the navigation apparatus 11; and setting a priority based on information acquired from a roadside machine or a beacon.

Figure 24:
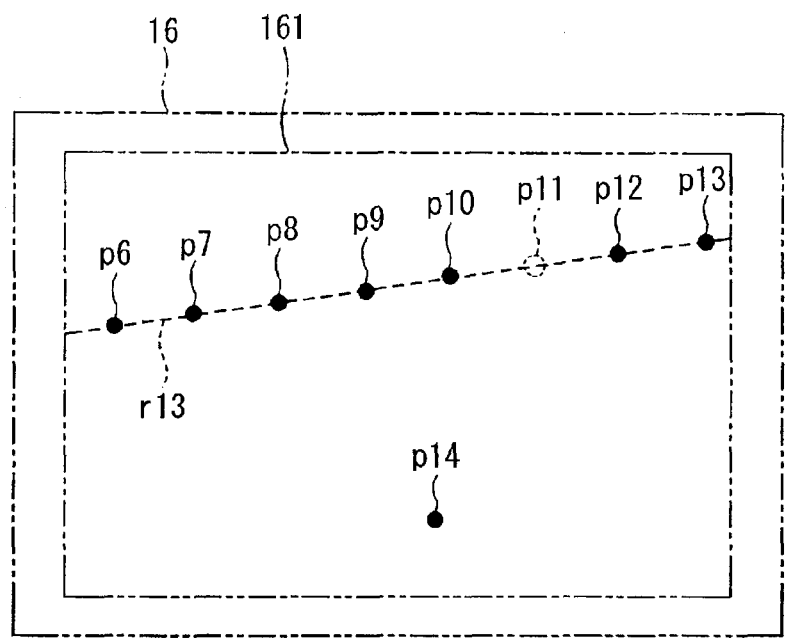
FIG. 24 is a diagram illustrating a modification of the course prediction process (11).

The server 31 can predict a course based on several GPS informations. According to an example in FIG. 24, the server 31 settles predicted course r13 based on points p6 through p13 specified by several GPS informations. In this case, the server 31 predicts and settles point p11 indicated by a broken line based on the positional relationship with the other points. The server 31 settles predicted course r13 by excluding point p14 that is apparently assumed to be abnormal. This enables to improve the accuracy of a process to settle a predicted course.

The server 31 may extend the range of searching for a predicted course on a mountain road near which no other roads exist. If a road exists within the range of specified distance from the vehicle position, the server 31 can settle this road as a predicted course while increasing the specified distance or extending the range of searching for the predicted course. For example, the server 31 can search for a nearest road and settle it as a predicted course even if the vehicle travels a mountain road. The server 31 may narrow a range of searching for a predicted course in an urban area where many roads exist around.

The map display system 10 according to the embodiment enables the navigation apparatus 11 to perform the simplified map matching that matches the current position of the navigation apparatus 11 with a predicted course the server 31 predicts based on the current position. The server supplies the navigation apparatus 11 with raster map data to display a map near the corrected position on the predicted course.

This enables to match the current position of the navigation apparatus 11 or the vehicle with the predicted course even if the raster map data contains no road data. The map matching can be performed regardless of map data types.

Before distributing the raster map data, the server 31 transmits the course data about the predicted course to the navigation apparatus 11. The server 31 supplies the navigation apparatus 11 with the raster map data corresponding to the map near the position corrected on the predicted course. The server 31 needs to transmit only road data about the predicted course to the navigation apparatus 11. This enables to save the amount of road data to be distributed. The server 31 need not attach road data to the raster map data to be distributed to the navigation apparatus 11 unlike the prior art that attaches road data to the raster map data. This enables to save the amount of entire map data to be distributed to the navigation apparatus 11.

Specified area S contains the corrected position and is wider than the screen 161 of the display portion 16. The server 31 distributes raster map data corresponding to area S to the navigation apparatus 11. The navigation apparatus 11 performs a general map matching process to display current position mark M at a position indicated by position data contained in the raster map data until the current position measured by the position measuring portion 13 deviates from area S.

According to this configuration, the server 31 need not distribute new raster map data until the current position of the navigation apparatus 11 deviates from area S corresponding to the distributed raster map data. This enables to decrease the number of times to distribute raster map data to the navigation apparatus 11 from the server 31.

The navigation apparatus 11 may restart transmitting GPS information to the server 31 when the current position measured by the position measuring portion 13 is going to deviate from area S. According to this configuration, the server 31 additionally distributes new raster map data to the navigation apparatus 11 when the process to transmit GPS information restarts.

This configuration can add new raster map data to the navigation apparatus 11 before the current position of the navigation apparatus 11 completely deviates from area S corresponding to the distributed raster map data. The map can be displayed uninterruptedly.

The navigation apparatus 11 may stop the process to transmit GPS information to the server 31 until the current position is going to deviate from area S. The navigation apparatus 11 may start the process to transmit GPS information to the server 31 when the current position is going to deviate from area S.

The disclosure is not limited to the embodiment but is applicable to various embodiments within the spirit and scope of the disclosure. For example, the map display apparatus is not limited to the navigation apparatus but may be configured as a mobile communication terminal.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A map display system including
   a map display apparatus to display a map based on raster-formed map data that is map data having raster form that displays a map as an image, and
   a server to distribute the raster-formed map data to the map display apparatus,
   the map display system comprising:
   a current position measuring processor that is provided in the map display apparatus and measures a current position of one of the map display apparatus and a vehicle mounted with the map display apparatus;
   a current position information transmission processor that is provided in the map display apparatus and transmits a plurality of current position informations, each of the current position informations indicating the current position measured by the current position measuring processor to the server;
   a course prediction processor that is provided in the server and predicts a course of one of the map display apparatus and the vehicle based on the plurality of the current position informations that are received from the one of the map display apparatus and the vehicle, the plurality of the current position informations indicating a progress situation of the one of the map display apparatus and the vehicle;
   a course data transmission processor that is provided in the server and transmits vector-formed course data that is course data having vector form, the vector-formed course data indicating the course predicted by the course prediction processor to the map display apparatus;
   a position correction processor that is provided in the map display apparatus and corrects the current position measured by the current position measuring processor on the course specified by the received vector-formed course data;
   a corrected position information transmission processor that is provided in the map display apparatus, settles, as a corrected position, the current position that the position correction processor corrects on the course, and transmits corrected position information indicating the corrected position to the server;
   a map data distribution processor that is provided in the server, specifies the corrected position based on the received corrected position information, and distributes the raster-formed map data corresponding to a specified area containing the corrected position to the map display apparatus; and
   a map display processor that is provided in the map display apparatus and displays a map on a screen of a display portion based on the received raster-formed map data.

2. The map display system according to claim 1, wherein:
   the map data distribution processor distributes the raster-formed map data to the map display apparatus, the raster-formed map data corresponding to a specified area that contains the corrected position and is wider than a screen of the display portion; and
   the map display processor displays a current position mark indicating the current position correspondingly to position data contained in the raster-formed map data until the current position measured by the current position measuring processor deviates from an area corresponding to the received raster-formed map data.

3. The map display system according to claim 2,
   wherein the current position information transmission processor transmits the current position information to the server when the current position measured by the current position measuring processor is going to deviate from an area corresponding to the received raster-formed map data.

4. The map display system according to claim 1,
   wherein the course prediction processor computes a vector connecting a plurality of points specified by the plurality of the current position informations and predicts a course of the vehicle, the course being equal to a road along the vector.

5. The map display system according to claim 1,
   wherein the course prediction processor computes a vector connecting a plurality of points specified by the plurality of the current position informations and predicts a course of the vehicle, the course being equal to a road containing a link ahead of the vector in a traveling direction.

6. The map display system according to claim 1,
   wherein the course prediction processor computes a vector connecting a plurality of points specified by the plurality of the current position informations and predicts a course of the vehicle, the course being equal to a road containing a link ahead of the vector in a traveling direction and another link whose road type equals a road type of the link.

7. The map display system according to claim 1, wherein the course prediction processor computes a vector connecting a plurality of points specified by the plurality of the corrected position informations and predicts a course of the vehicle, the course being equal to a road containing a link ahead of the vector in a traveling direction and another link that is included in links connected to the link and has travel history.

8. The map display system according to claim 1, wherein the course prediction processor computes a vector connecting a plurality of points specified by the plurality of the current position informations and predicts a course of the vehicle, the course being equal to a road containing a link ahead of the vector in a traveling direction and a link contained in a guidance route settled by a map display apparatus.

9. The map display system according to claim 1, wherein the course prediction processor predicts a plurality of courses of the vehicle.

10. The map display system according to claim 1, wherein the course prediction processor settles a priority of each link to form a road and predicts a course of the vehicle, the course being equal to a road containing a highly prioritized link.

11. The map display system according to claim 1, wherein
the corrected position information that is transmitted to the server was corrected based on the vector-formed course data,
the map display apparatus, which has the vector-formed course data for the corrected position on the course specified by the vector-formed course data, may not contain raster-formed map data corresponding to a map near the corrected position on the course specified by the vector-formed course data, and
the map data distribution processor provided in the server generates the raster-formed map data, which is distributed to the map display apparatus, and wherein the raster-formed map data corresponds to the corrected position information which was corrected to be on the course based on the vector-formed course data.

12. The map display system according to claim 1, wherein the map display apparatus, which has the vector-formed course data for the corrected position on the course specified by the vector-formed course data, may or may not contain raster-formed map data corresponding to a map near the corrected position on the course specified by the vector-formed course data,
wherein the server is configured to determine whether the current position based on the current position informations is going to deviate from the specified area for which the raster-formed map data was distributed to the map display apparatus, and
when the current position based on the current position informations is determined to deviate from the specified area for which the raster-formed map data was distributed to the map display apparatus, the server:
predicts, by the course prediction processor, a new course based on the current position informations, and then
transmits, by the course data transmission processor, to the map display apparatus, the vector-formed course data indicating the new course.

13. A map display system including
a map display apparatus to display a map based on raster-formed map data that is map data having raster form that displays a map as an image, and
a server to distribute the raster-formed map data to the map display apparatus,
the map display system comprising:
a current position measuring processor that is provided in the map display apparatus and measures a current position of one of the map display apparatus and a vehicle mounted with the map display apparatus;
a current position information transmission processor that is provided in the map display apparatus and transmits a plurality of current position informations, each of the current position informations indicating the current position measured by the current position measuring processor to the server;
a course prediction processor that is provided in the server and predicts a course of one of the map display apparatus and the vehicle based on the plurality of the current position informations that are received from the one of the map display apparatus and the vehicle, the plurality of the current position informations indicating a progress situation of the one of the map display apparatus and the vehicle;
a course data transmission processor that is provided in the server and transmits vector-formed course data that is course data having vector form, the vector-formed course data indicating the course predicted by the course prediction processor to the map display apparatus;
a position correction processor that is provided in the map display apparatus and corrects the current position measured by the current position measuring processor to a position on the course specified by the received vector-formed course data;
a corrected position information transmission processor that is provided in the map display apparatus, settles, as a corrected position, the current position that the position correction processor corrects to the position on the course specified by the received vector-formed course data, and transmits corrected position information indicating the corrected position on the course specified by the received vector-formed course data to the server to cause the server to distribute, to the map display apparatus, the raster-formed map data corresponding to a specified area containing the corrected position;
a map data distribution processor that is provided in the server, specifies the corrected position based on the received corrected position information, and distributes the raster-formed map data corresponding to the specified area containing the corrected position to the map display apparatus; and
a map display processor that is provided in the map display apparatus and displays a map on a screen of a display portion based on the received raster-formed map data.

14. The map display system according to claim 1, wherein the map display processor in the map display apparatus is further configured to
determine whether a raster map data storage portion in the map display apparatus includes the raster-formed map data corresponding to a map near the corrected position on the course specified by the vector-formed course data, and
transmit a raster map request signal and the corrected position information to the server only when the raster map data storage portion is determined to not include the raster-formed map data corresponding to the map near the corrected position on the course specified by the vector-formed course data.

* * * * *